(12) United States Patent
Itoguchi et al.

(10) Patent No.: US 10,941,221 B2
(45) Date of Patent: Mar. 9, 2021

(54) METHOD FOR PRODUCING POLYOLEFIN AND POLYOLEFIN PRODUCTION SYSTEM

(71) Applicant: Sumitomo Chemical Company, Limited, Tokyo (JP)

(72) Inventors: Satoshi Itoguchi, Ichihara (JP); Naganjaneyulu Suruvu, Ichihara (JP); Shunpei Funaoka, Ichihara (JP)

(73) Assignee: SUMITOMO CHEMICAL COMPANY, LIMITED, Tokyo (JP)

( * ) Notice: Subject to any disclaimer, the term of this patent is extended or adjusted under 35 U.S.C. 154(b) by 190 days.

(21) Appl. No.: 16/114,417

(22) Filed: Aug. 28, 2018

(65) Prior Publication Data

US 2019/0062465 A1    Feb. 28, 2019

(30) Foreign Application Priority Data

Aug. 29, 2017   (JP) .................................. 2017-164708

(51) Int. Cl.
| | | |
|---|---|---|
| C08F 2/34 | (2006.01) | |
| C08F 10/06 | (2006.01) | |
| C08F 2/01 | (2006.01) | |
| B01J 8/00 | (2006.01) | |
| B01J 8/18 | (2006.01) | |
| B01J 8/24 | (2006.01) | |
| B01J 8/28 | (2006.01) | |
| B01J 8/26 | (2006.01) | |
| C08F 2/00 | (2006.01) | |

(52) U.S. Cl.
CPC .............. *C08F 2/34* (2013.01); *B01J 8/0055* (2013.01); *B01J 8/1809* (2013.01); *B01J 8/1818* (2013.01); *B01J 8/1827* (2013.01); *B01J 8/24* (2013.01); *B01J 8/245* (2013.01); *B01J 8/26* (2013.01); *B01J 8/28* (2013.01); *C08F 2/001* (2013.01); *C08F 10/06* (2013.01); *B01J 2208/00017* (2013.01); *B01J 2208/00539* (2013.01); *B01J 2208/00548* (2013.01); *B01J 2208/00938* (2013.01); *B01J 2219/00774* (2013.01)

(58) Field of Classification Search
USPC .................................... 422/134, 142; 526/65
See application file for complete search history.

(56) References Cited

U.S. PATENT DOCUMENTS

| | | | |
|---|---|---|---|
| 4,045,180 A | 8/1977 | Young et al. | |
| 5,235,009 A | 8/1993 | Hogan | |
| 2004/0230014 A1 | 11/2004 | Kougo | |
| 2009/0149610 A1 | 6/2009 | Sato et al. | |
| 2009/0149620 A1* | 6/2009 | Sato ........................ | B01J 8/1872 526/348 |
| 2009/0171019 A1 | 7/2009 | Kumamoto et al. | |
| 2010/0029867 A1 | 2/2010 | Takahashi et al. | |
| 2010/0317811 A1 | 12/2010 | Mazzucco et al. | |
| 2011/0269922 A1 | 11/2011 | Kang et al. | |
| 2013/0165605 A1* | 6/2013 | Soffritti .................. | B01J 8/1827 526/65 |

FOREIGN PATENT DOCUMENTS

| | | |
|---|---|---|
| EP | 2275454 A1 | 1/2011 |
| EP | 2594333 A1 | 5/2013 |
| EP | 2602269 A1 | 6/2013 |
| EP | 2803680 A1 | 11/2014 |
| JP | 2003277412 A | 10/2003 |
| JP | 2009173897 A | 8/2009 |
| JP | 2011508800 A | 3/2011 |

OTHER PUBLICATIONS

Search Report dated Dec. 4, 2018 in EP Application 18189323.1.

* cited by examiner

*Primary Examiner* — Fred M Teskin
(74) *Attorney, Agent, or Firm* — Panitch Schwarze Belisario & Nadel LLP

(57) ABSTRACT

A polyolefin production system is provided. The polyolefin production system includes a plurality of gas-phase polymerization tanks configured to polymerize an olefin gas to form a polyolefin, a compressor comprising an inlet and an outlet and being configured to compress a an olefin-containing gas, an individual gas feed line disposed at each of the gas-phase polymerization tanks and configured to guide the gas fed from the outlet of the compressor to each of the gas-phase polymerization tanks, an individual gas discharge line disposed at each of the gas-phase polymerization tanks and discharging the gas from each of the gas-phase polymerization tanks, and a first valve installed in each of the individual gas feed lines.

12 Claims, 19 Drawing Sheets

METHOD FOR PRODUCING POLYOLEFIN AND POLYOLEFIN PRODUCTION SYSTEM

CROSS-REFERENCE TO RELATED APPLICATION

This application claims priority under 35 U.S.C. § 119(b) to Japanese Application No. 2017-164708, filed Aug. 29, 2017, the disclosure of which is incorporated herein by reference in by its entirety.

TECHNICAL FIELD

The present invention relates to a method for producing a polyolefin and polyolefin production system.

BACKGROUND

A method for producing polyolefin by polymerizing olefin in a system having a plurality of gas-phase polymerization tanks in which olefins are polymerized is conventionally known.

The method described above is disclosed, for example, in Japanese Unexamined Patent Publication No. 2011-508800, Japanese Unexamined Patent Publication No. 2003-277412, U.S. Pat. No. 5,235,009, and Japanese Unexamined Patent Publication No. 2009-173897.

SUMMARY

In the conventional method, however, a plurality of compressors may be required, or control of the gas flow rate and pressure in each of the gas-phase polymerization tanks may be not easy in some cases.

An object of the present invention made in the light of these circumstances is to provide a method for producing a polyolefin and a polyolefin production system, capable of easily controlling the gas flow rate and pressure in each of the gas-phase polymerization tanks even with a small number of compressors.

The polyolefin production system of the present invention comprises:

a plurality of gas-phase polymerization tanks configured to polymerize an olefin gas to form a polyolefin;

a compressor comprising an inlet and an outlet and being configured to compress an olefin-containing gas;

an individual gas feed line disposed at each of the gas-phase polymerization tanks, configured to guide the gas fed from the outlet of the compressor to each of the gas-phase polymerization tanks;

an individual gas discharge line disposed at each of the gas-phase polymerization tanks, configured to discharge the gas from each of the gas-phase polymerization tanks; and a first valve installed in each of the individual gas feed lines.

According to the present invention, the flow rate of the gas fed to each of the gas-phase polymerization tanks can be easily controlled at any constant value even with a small number of compressors. Further, the pressure in each of the gas-phase polymerization tanks can be easily maintained in a pressure range comparable to each other.

The system can further comprise a particle transfer series line connecting the plurality of the gas-phase polymerization tanks in series.

According to the system, multi-stage polymerization is achieved with merits of being capable of improving a reaction efficiency, further narrowing the residence time distribution of polyolefin particles in a polymerization tank, and the like.

Here, the first valve may be a butterfly valve or an eccentric rotary plug valve.

The system can further comprise a second valve installed in each of the individual gas discharge line.

The pressure in each of the gas-phase polymerization tanks can be thereby individually set, so that the stability of polymerization, the stability of transfer of polyolefin particles from each of the gas-phase polymerization tanks to a rear tank, the resistance to disturbance, and the like can be improved.

Also, the second valve may be a butterfly valve or an eccentric rotary plug valve.

The system may have further a gas recovery line connecting the plurality of the individual gas feed lines and the inlet of the compressor to each other.

Also, the system can comprise a cone member having a tapered slope with inner diameter thereof becoming smaller downward and an opening at the bottom end of the tapered slope, or a gas distributor.

The method for producing a polyolefin of the present invention is a method for producing a polyolefin with use of the polyolefin production system, and comprises:

a step of feeding an olefin-containing gas compressed by the compressor to the gas-phase polymerization tanks through the individual gas feed lines;

a step of returning the gas discharged from each of the gas-phase polymerization tanks to the compressor through each of the individual gas discharge lines; and a step of controlling the flow rates of the olefin-containing gas to be fed to the gas-phase polymerization tanks through the first valves installed in the individual gas feed lines.

Hereupon, the method may further comprise a step of transferring polyolefin particles sequentially from the frontmost gas-phase polymerization tank to the rearmost gas-phase polymerization tank through the particle transfer series line.

Also, the method may further comprise a step of controlling aperture of at least one of the second valves to control the gas discharge flow rate from the gas-phase polymerization tank in such a manner that the difference between the pressure in the gas-phase polymerization tank and the pressure in the gas recovery line, the difference between the pressure in the gas-phase polymerization tank and the pressure in the downstream part than the second valve in the individual gas discharge line connected to the gas-phase polymerization tank, the pressure in the gas-phase Polymerization tank, the difference between the pressure in the gas-phase polymerization tank and the pressure in the gas-phase polymerization tank in the upstream or downstream position than the gas-phase polymerization tank is in a desired range.

Also, in each of the gas-phase polymerization tanks, a fluidized of polyolefin particles bed or a spouted bed of polyolefin particles can be formed.

According to the present invention, a method and a system capable of easily controlling the gas flow rate and the pressure in each of the gas-phase polymerization tanks even with a small number of compressors, are provided.

DETAILED DESCRIPTION

With reference to drawings, a method for producing a polyolefin in embodiments of the present invention is described.

First Embodiment

Figure 1:
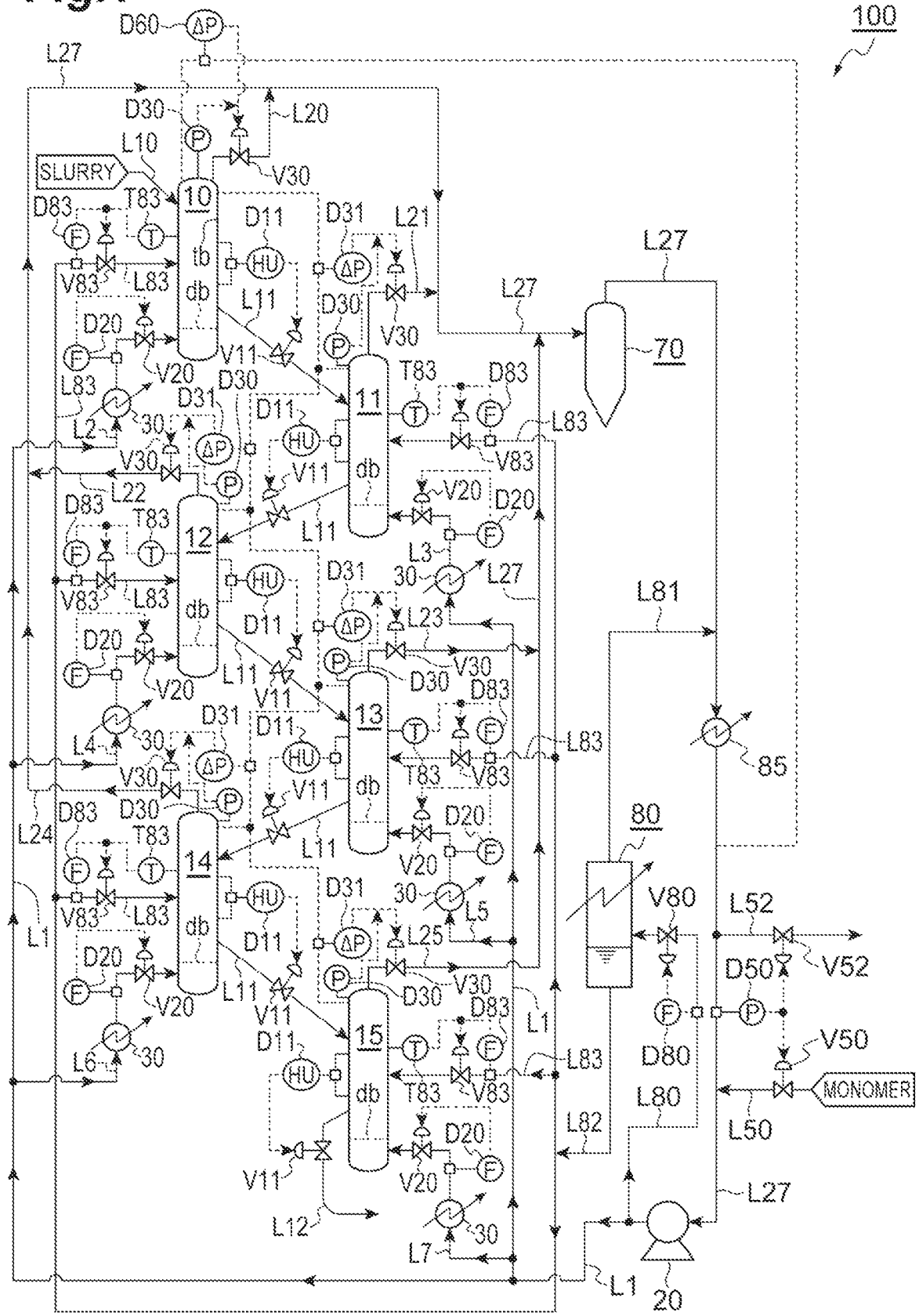
FIG. 1 is a flow chart illustrating a polyolefin production system for use in the production method of polyolefins in a first embodiment of the present invention.

FIG. 1 is a flow chart illustrating a polyolefin production system 100 for use in the production method of polyolefins in a first embodiment of the present invention.

The polyolefin production system 100 mainly comprises gas-phase polymerization tanks 10 to 15, a compressor 20, a cyclone 70, and a condenser 80.

In each of the gas-phase polymerization tanks 10 to 15, an olefin gas fed thereto is polymerized to form polyolefins. In the present embodiment, each of the gas-phase polymerization tanks 10 to 15 has a cylindrical container tb extending in the vertical direction and a distributor db installed in the cylindrical container tb, allowing a gas fed under the distributor db to form a fluidized bed of polyolefin particles on the distributor db.

The gas-phase polymerization tanks 10 to 15 are connected in series in this order with a particle transfer series line L11, so that polyolefin particles can be transferred to the downstream side. The particle transfer series line L11 is a line separate from an individual gas discharge line L20. To the rearmost gas-phase polymerization tank 15, the particle discharge line L12 is connected. Each of the particle transfer series line L11 and the particle discharge line L12 is provided with a valve V11 for adjusting the flow rate of particles. To the frontmost gas-phase polymerization tank 10, a line L10 for feeding a catalyst component is connected.

Each of the gas-phase polymerization tanks 10 to 15 is provided with a detector D11 for measuring the hold-up (mass) of particles in the tank. Specifically, the detector D11 can measure the hold-up of particles based on, for example, a differential pressure between the top and bottom of a fluidized bed.

The aperture of each valve V11 for adjusting the flow rate of particles is adjusted such that the particle hold-up in a gas-phase polymerization tank on the upstream side measured by the detector D11 is in a certain predetermined range.

To the gas-phase polymerization tanks 10 to 15, individual gas feed lines L2 to L7 respectively are connected, individually feeding an olefin-containing gas fed from the outlet of the compressor 20 through a gathering line L1 under the distributor db of each of the gas-phase polymerization tanks 10 to 15. The gathering line L1 connects the outlet of the compressor 20 with the branching point branching to the individual gas feed lines L2 and L4, and the outlet of the compressor 20 with the branching point branching to the individual gas feed lines L3 and L5. The individual gas feed lines L2, L4, L6, L3, L5, L7 are branched off from the gathering line L1. Namely, the individual gas feed line is a part between the inlet of the gas-phase polymerization tank and the point where the line connected to other gas-phase polymerization tank is merged, in the line connecting the outlet of the compressor with the inlet of the gas-phase polymerization tank.

Each of the individual gas feed lines L2 to L7 is provided with a heat exchanger 30 for cooling gas. Each of the individual gas feed lines L2 to L7 is further provided with a detector D20 for detecting the flow rate and a valve (first valve) V20 for adjusting the flow rate. The aperture of the valve V20 is adjusted such that the flow rate of gas measured by the detector D20 is in a certain predetermined range.

Although the type of the valve (first valve) V20 for adjusting the flow rate is not limited, a butterfly valve and an eccentric rotary plug valve are preferred from the viewpoints of excellent controllability of the flow rate adjustment and capability of preventing powder from clogging in the valve.

The gas-phase polymerization tanks 10 to 15 are provided with individual gas discharge lines L20 to L25, respectively, discharging the gas from the top of the gas-phase polymerization tanks 10 to 15 respectively. These individual gas discharge lines L20 to L25 are connected to the inlet of the compressor 20 through a gas collection line L27. The gas recovery line L27 connects the inlet of the compressor 20 with the merging point where the individual gas discharge lines L24 and L22 merge, and the inlet of the compressor 20 with the merging point where the individual gas feed lines L25 and L23 merge. The individual gas discharge lines L24, L22, L20, L21, L23, L25 are merged to the gas recovery line L27. Namely, the individual gas discharge line is a part between the outlet of the gas-phase polymerization tank and the point where the line connected to other gas-phase polymerization tank is merged, in a line connecting the inlet of the compressor and the outlet of the gas-phase polymerization tank.

To the individual gas discharge lines L20 to L25, valves (second valves) V30 for adjusting pressure are connected, respectively.

The gas-phase polymerization tank 10 is provided with a pressure gauge D60 measuring a pressure difference between the pressure in the gas-phase polymerization tank 10 and the pressure in the gas recovery line L27. The aperture of the valve V30 in the individual gas discharge line L20 is adjusted such that the pressure difference is in a certain predetermined range based on the pressure gauge D60. When the aperture of the valve V30 in the individual gas discharge line L20 is adjusted based on the pressure gauge D60, the pressure in the gas-phase polymerization tank 10 is adjusted in response to the pressure change of the gas recovery line L27 and this is preferable. Since the pressure in the gas recovery line L27 and the pressure in the downstream part than the valve V30 in the individual gas discharge line L20 are the same, the pressure difference given by the pressure gauge D60 is also the difference between the pressure in the gas-phase polymerization tank 10 and the pressure in the downstream part than the valve V30 in the individual gas discharge line L20.

The gas-phase polymerization tank 10 is provided with a pressure gauge D30 measuring a pressure (absolute or gauge pressure) of the gas-phase polymerization tank 10, and the aperture of the valve V30 in the individual gas discharge line L20 may be adjusted such that the pressure in the gas-phase polymerization tank 10 is in a certain predetermined range base on the pressure at the pressure gauge D30.

Although the type of the valve (second valve) V30 for adjusting the pressure is not limited, a butterfly valve and an eccentric rotary plug valve are preferred from the viewpoints of controllability excellent in pressure adjustment and capability of preventing powder from clogging in the valve.

Each of the gas-phase polymerization, tanks 11 to 15 is provided with a pressure gauge D31 measuring the difference in pressure between each of the gas-phase polymerization tanks 11 to 15 and the gas-phase polymerization tank preceding the each of the gas-phase polymerization tanks. The aperture of the valve V30 in each of the individual gas discharge lines L21 to L25 is adjusted such that the differential pressure is in a certain predetermined range based on the differential pressure at a pressure gauge D31.

Although the second valve V30 in the individual gas discharge line L21 is controlled by the pressure gauge D31 that measures the difference between the pressure in the gas-phase polymerization tank 11 connected with the individual gas discharge line L21 having the second valve V30 and the pressure in the gas-phase polymerization tank 10 upstream of the gas-phase polymerization tank 11, the second valve V30 can be controlled by the pressure gauge D31 that measures the difference between the pressure in the gas-phase polymerization tank 11 and the pressure in the gas-phase polymerization tank 12 downstream of the gas-phase polymerization tank 11. The control of the valves V30 installed in the individual gas discharge L22 to L25 can be changed like the above.

The pressure in each of the gas-phase polymerization tanks 11 to 15 is thereby controlled in a certain predetermined range. For example, in the case where the differential pressure is set at zero, the pressures in the gas-phase polymerization tanks 10 to 15 are the same to each other, and in the case where the differential pressure is set at a constant value other than zero, the pressures in the gas-phase polymerization tanks 10 to 15 can be different from each other.

Each of the polymerization tanks 11 to 15 is provided with a pressure gauge (absolute or gauge pressure) D30, the aperture of each of the valves V30 in the individual gas discharge line L21 to L25 may be adjusted such that the pressure in the each of the gas-phase polymerization tank 11 to 15 is in a certain predetermined range based on the pressure gauge D30.

Each of the gas-phase polymerization tanks 11 to 15 may be provided with a pressure gauge (not shown) measuring a pressure difference between the pressure in the each gas-phase polymerization tanks 11 to 15 and the pressure in the gas recovery line L27, as well as the pressure gauge D60 provided to the gas-phase polymerization tank 10. The aperture of the each valve V30 in the individual gas discharge line L21 to L25 may be adjusted such that the pressure difference is in a certain predetermined range based on the pressure gauge. Since the pressure in the gas recovery line L27 and the pressure in the downstream part than the valve V30 in the individual gas discharge line L21 to L25 are the same, the pressure difference given by the pressure gauge is also the difference between the pressure in the each of the gas-phase polymerization tank 11 to 15 and the pressure in the downstream part than the valve V30 in the each of the individual gas discharge line L21 to L25.

The gas collection line L27 is provided with a cyclone 70 for collecting particles in the gas, and a heat exchanger 85 for heating or cooling the gas.

In order to prevent the valve V30 from being under bad effects by particles such as clogging of particles, a cyclone may be installed upstream of the valve V30 in the each of the individual gas discharge lines L20 to L25.

It is preferable that intentional opening the valve V30 at an arbitrary aperture for a predetermined duration at a predetermined time intervals to prevent the valve V30 from particle clogging.

The gas collection line L27 is further provided with a pressure gauge D50 for detecting the pressure in the gas collection line L27. Also, to the gas collection line L27, a monomer feed line L50 having a valve V50 for adjusting pressure and a gas discharge line L52 having a valve V52 for adjusting pressure are connected.

In order to control the pressure in the gas collection line L27, i.e., the pressure in an circulation system of olefin monomers on the low-pressure side, in a certain predetermined range, the valves V50 and V52 adjust the amount of monomer gas flowing in the gas collection line L27 through the line L50 and the amount of gas discharged from the gas collection line L27 through the line L52, based on the pressure at the pressure gauge D50.

The condenser 80 and the compressor 20 are connected through a line L80. The line L80 is provided with a valve V80 for adjusting the flow rate and a flow rate detector D80. The aperture of the valve V80 is adjusted such that the amount of the gas fed to the condenser 80 from the compressor 20 is in a certain predetermined range, based on the flow rate detected by the flow rate detector D80.

In the condenser 80, the gas is cooled to form liquefied olefins. Unliquefied gas is returned to the gas collection line L27 through a line L81.

To each of the gas-polymerization tanks 10 to 15, an individual liquefied olefin introduction line L83 for individually feeding liquefied olefins fed from the condenser 80 to each of the gas phase polymerization tanks 10 to 15 through a gathering line L82 is connected.

Each of the individual liquefied olefin introduction lines L83 is provided with a flow rate detector D83 and a valve V83 for adjusting flow rate. Also, each of the gas-phase polymerization tanks 10 to 15 is provided with a temperature detector T83 for measuring the temperature of a fluidized bed. The aperture of the valve V83 is adjusted based on the temperature detected by the temperature detector T83, such that the flow rate of the liquefied olefins fed to each of the gas-phase polymerization tanks 10 to 15 is in a certain range predetermined corresponding to the temperature of the fluidized bed.

Method for Producing a Polyolefin

A method for producing polyolefin particles with use of such a polyolefin production system is described below.

An olefin-containing gas compressed by a compressor 20 is fed to the gas-phase polymerization tanks 10 to 15 through a gathering line L1 and individual gas feed lines L2 to L7 respectively so as to obtain polyolefin-containing particles through polymerization of olefins in each of the gas-phase polymerization tanks 10 to 15.

Hereupon, the flow rate of the olefin-containing gas to be fed to the gas-phase polymerization tanks 10 to 15 is controlled in a certain predetermined range by a valve V20 installed in the individual gas feed lines L2 to L5 respectively.

Gas containing unreacted olefins discharged from the gas-phase polymerization tanks 10 to 15 is returned to a compressor 20 through individual gas discharge lines L20 to L25 respectively and a gas collection line L27.

Hereupon, the flow rate of the gas containing unreacted olefins discharged from the gas-phase polymerization tanks 10 to 15 is controlled by a valve V30 installed in the individual gas discharge lines L20 to L25 respectively, such that the pressure in the gas-phase polymerization tanks 10 to 15 respectively is in a certain predetermined range.

The pressure in the gas-phase polymerization tanks 10 to 15 may be in a range allowing olefins to be present in a gas phase in the gas-phase polymerization tanks 10 to 15, typically normal pressure to 10 MPaG, preferably 0.2 to 8 MPaG, more preferably 0.5 to 5 MPaG.

The temperature in the gas-phase polymerization tanks 10 to 15 may be typically 0 to 120° C., preferably 20 to 100° C., more preferably 40 to 100° C.

Since the polymerization reaction is an exothermic reaction, the temperature of the gas discharged from a gas-phase polymerization tank increases. Through appropriate cooling of a circulated gas by heat exchangers 85 and 30, the temperature in the gas-phase polymerization tanks 10 to 15 can be controlled in a certain range.

Also, when the temperature in a gas-phase polymerization tank increases beyond a specified range, liquid olefins may be fed into the gas-phase polymerization tank through the individual liquefied olefin introduction line L83, so that polyolefin particles and the like can be efficiently cooled by the latent heat of vaporization of the liquid olefins. Specifically, the aperture of a valve V83 in each of the individual liquefied olefin introduction line L83 is adjusted to feed a predetermined amount of liquid olefins into the gas-phase polymerization tank corresponding to the temperature in each, of the gas-phase polymerization tanks.

The olefins consumed by a polymerization reaction in each of the gas-phase polymerization tanks 10 to 15 are compensated into the compressor 20 through a line L50.

Polyolefin particles containing the polyolefin produced in each of the gas-phase polymerization tanks 10 to 15 are transferred to the rear gas-phase polymerization tanks through particle transfer series lines L11 respectively.

Hereupon, with a pressure $P_2$ in the rear gas-phase polymerization tank being lower than a pressure $P_1$ in the front gas-phase polymerization tank, particles can be easily transferred. In addition thereto, with the connection place between the rear gas-phase polymerization tank and the particle transfer series line L11 being lower than the connection place between the front gas-phase polymerization tank and the particle transfer series line L11, the particle transfer series line L11 can have a downward gradient part from the front tank to the rear tank, so that the transfer of particles can be more easily performed. It is preferable that the particle transfer series line L11 has no upward gradient part and no horizontal part. With the angle made between the direction of the particle transfer series line extending diagonally downward and a horizontal plane being represented by an inclination angle θ of the transfer line, the inclination angle θ is preferably 30° or more, more preferably 35° or more, furthermore preferably 40° or more, particularly preferably 55° or more. The upper limit is 90°.

Specifically, it is preferable that 130 kPa≥$P_1$-$P_2$≥0 is satisfied.

Hereupon, amount of polyolefin particles transferred to the rear gas-phase polymerization tank through each of the particle transfer series line L11 is controlled by each valve V11 such that the particle hold-up (mass) in the front gas-phase polymerization tanks is in a certain range.

The average residence time of polyolefin particles in each of the gas-phase polymerization tanks can be 0.01 to 10 hours, preferably 0.1 to 1 hour.

In each of the gas-phase polymerization tanks 10 to 15, it is preferable that the polymerization is performed in the presence of a polymerization catalyst. As a method for feeding a polymerization catalyst to the gas-phase polymerization tank 10, catalyst-containing polyolefin particles produced by polymerization of polyolefin particles in advance in the presence of a catalyst in a prior polymerization tank not shown in drawing may be fed. Alternatively, as the polymerization catalyst fed into the gas-phase polymerization tank 10, a preliminary polymerized catalyst or a solid catalyst may be directly fed.

Examples of the method of prior polymerization include, though not particularly limited, a method for polymerizing olefins in liquefied olefins, which is referred to as bulk polymerization and in that case, a slurry containing liquefied olefin and polyolefin particles is fed to the gas-phase polymerization tank 10 through the line L10.

In the gas-phase polymerization tanks 11 to 15, due to the catalyst in the polyolefin particles fed from the frontmost gas-phase polymerization tank 10, the olefins can be efficiently polymerized.

The particles discharged from the rearmost gas-phase polymerization tank 15 through the line L12 are appropriately subjected to treatments such as drying and deactivation to obtain polyolefin particles using known methods. The polyolefin particles produced before deactivation may be subjected to a further polymerization step.

Effect

According to the present embodiment, an olefin-containing gas compressed by one compressor 20 is fed to the gas-phase polymerization tanks 10 to 15 through the individual gas feed lines L2 to L7, and the gas discharged from the individual gas discharge lines L20 to L25 disposed at the gas-phase polymerization tanks 10 to 15 can be returned to the one compressor 20, so that the number of compressors can be reduced.

Also, the gas compressed by one compressor can be fed to each of the gas-phase polymerization tanks 10 to 15, so that the pressure in each of the gas-phase polymerization tanks 10 to 15 can be easily maintained in about the same pressure range.

Furthermore, the flow rates f the olefin-containing gas to be fed to the gas-phase polymerization tanks 10 to 15 can be controlled by valves first valve) V20 installed in the individual gas feed lines L2 to L7. The flow rate of the gas fed to each of the gas-phase polymerization tanks 10 to 15 can be therefore easily controlled to be any constant value. The stable production of polyolefins can be thereby achieved.

Also, polyolefin particles can be transferred from the frontmost gas-phase polymerization tank 10 to the rearmost gas-phase polymerization tank 15 through the particle transfer series lines L11, so that multi-stage polymerization of polyolefins is achieved with effects of being capable of improving a reaction efficiency, further narrowing the residence time distribution of polyolefin particles in a polymerization tank, and the like.

Furthermore, the apertures of valves V30 installed in individual gas discharge lines L20 to L25 can be controlled such that the pressure in the gas-phase polymerization tanks 10 to 15 respectively is in a desired range. The pressure in each of the gas-phase polymerization tanks 10 to 15 can be therefore individually set easily in a certain range, so that the stability of polymerization, the resistance to disturbance and the like can be improved. Furthermore, a slight difference in pressure can be easily made among the gas-phase polymerization tanks 10 to 15, so that the transfer of particles in the particle transfer series line L11 can be suitably performed.

Catalyst for Use in Producing Polyolefin

Examples of the catalyst for use in producing polyolefins in the present invention include a Ziegler-Natta catalyst and a Metallocene catalyst, preferably a Ziegler-Natta catalyst. Examples of the Ziegler-Natta catalyst include a Ti—Mg catalyst such as a solid catalyst component obtained by bringing a magnesium compound into contact with a titanium compound; and a catalyst containing a solid catalyst component obtained by bringing a magnesium compound into contact with a titanium compound, an organoaluminum compound, and, on an as needed basis, a third component such as an electron-donating compound; preferably a catalyst containing a solid catalyst component obtained by bringing a magnesium compound into contact with a titanium compound, an organoaluminum compound, and, on an as needed basis, a third component such as an electron-donating compound; more preferably a catalyst containing a solid catalyst component obtained by bringing a magnesium compound into contact with a halogenated titanium compound, an organoaluminum compound, and an electron-donating compound. As the catalyst, a catalyst preliminarily activated by contact with a small amount of olefins may be used.

An example of the detail of the catalysts and the production method is disclosed, for example, in Japanese Unexamined Patent Publication No. 117-216017 and Japanese Unexamined Patent Publication No. 2004-67850.

Regarding Olefin and Polyolefin

Examples of the olefins fed to each of the gas-phase polymerization tanks include at least one selected from the group consisting of α-olefins having 1 to 12 carbon atoms. For example, in the case where ethylene is fed to a gas-phase polymerization tank, polyethylene-containing particles can be obtained, and in the case where propylene is fed, polypropylene-containing particles can be obtained.

The olefins fed to each of the gas-phase polymerization tanks may include two or more types of olefins. For example, in the case where ethylene and at least one selected from the group consisting of α-olefins having 3 to 12 carbon atoms are fed, particles containing ethylene-α-olefin copolymers can be obtained. Specifically, in the cases of the α-olefins of propylene, 1-butene, 1-hexene and 4-methyl-1-pentene, particles containing an ethylene-propylene copolymer, an ethylene-1-butene copolymer, an ethylene-1-hexene copolymer and an ethylene-4-methyl-1-pentene copolymer, respectively, can be obtained. Alternatively, in the cases where propylene and at least one olefin selected from the group consisting of α-olefins having 4 to 12 carbon atoms are fed to a gas-phase polymerization tank, particles containing propylene-α-olefin copolymers can be obtained. Specifically, in the case of the α-olefin of 1-butene, particles containing a propylene-1-butene copolymer can be obtained.

It is preferable that the olefins include propylene. As a result, particles containing a polymer or a copolymer including propylene as a monomer unit can be obtained.

Furthermore, to each of the gas-phase polymerization tanks, an olefin monomer having a composition to provide a polymer or a copolymer that is the same as the polymer or the copolymer to constitute the polyolefin particles fed from the prior polymerization tank may be fed, or an olefin monomer having a composition to provide a polymer or a copolymer that is different from the polymer or the copolymer to constitute the polyolefin particles fed from the prior polymerization tank may be fed. Particles of so-called heterophasic olefin polymer containing a plurality of polyolefins with different monomer units at different ratios from each other can be thereby obtained.

In this case, it is preferable that the olefin monomers in each step invariably contain propylene, so that particles of heterophasic propylene polymer, as a mixture of propylene (co-)polymers which invariably contain propylene as a monomer unit, with different monomers at different ratios from each other, can be obtained.

Examples of the heterophasic propylene polymer in the present embodiment include the following:

(i) a propylene polymer containing a propylene homopolymer component (I-1) and a propylene copolymer component (II);

(ii) a propylene polymer containing a propylene copolymer component (I-2) and a propylene copolymer component (II); and (iii) a propylene polymer containing a propylene homopolymer component (I-1), a propylene copolymer component (I-2) and a propylene copolymer component (II).

The propylene homopolymer component (I-1) is a homopolymer component of propylene that is only composed of monomer units derived from propylene. More specifically, the propylene copolymer component (I-2) and the propylene copolymer component (II) are as follows.

(Propylene Copolymer Component (I-2)):

A copolymer component containing monomer units derived from propylene and monomer units derived from at least one olefin selected from the group consisting of ethylene and α-olefins having 4 or more and 12 or less of carbon atoms, with a content of the monomer units derived from at least one olefin selected from the group consisting of ethylene and α-olefins having 4 or more and 12 or less of carbon atoms of 0.01 wt % or more and less than 15 wt %, preferably 0.01 wt % or more and less than 12 wt %, more preferably 3 wt % or more and less than 10 wt %, based on a total weight of the propylene copolymer component (I-2) of 100 wt %. The content of the monomer units derived from propylene may be 85 wt % or more, or may be 90 wt % or more.

Propylene Copolymer Component (II):

A copolymer component containing monomer units derived from at least one olefin selected from the group consisting of ethylene and α-olefins having 4 or more and 12 or less of carbon atoms and monomer units derived from propylene, with a content of the monomer units derived from at least one olefin selected from the group consisting of ethylene and α-olefins having 4 or more and 12 or less of carbon atoms of 10 wt % or more and 80 wt % or less, preferably 20 wt % or more and 70 wt % or less, more preferably 25 wt % or more and 60 wt % or less, based on a total weight of the propylene polymer component (II) 100 wt %. The content of the monomer units derived from propylene may be 20 wt % or more and 90 wt % or less.

Examples of the propylene copolymer component (I-2) include a propylene-ethylene copolymer component, a propylene-1-butene copolymer component, a propylene-1-hexene copolymer component, a propylene-1-octene copolymer component, a propylene-1-decene copolymer component, a propylene-ethylene-1-butene copolymer component, a propylene-ethylene-1-hexene copolymer component, a propylene-ethylene-1-octene copolymer component, and a propylene-ethylene-1-decene copolymer component, and preferably a propylene-ethylene copolymer component, a propylene-1-butene copolymer component, and a propylene-ethylene-1-butene copolymer component.

Examples of the propylene copolymer component (II) are the same as described above.

Examples of the heterophasic propylene polymer of the present embodiment include a (polypropylene)-(ethylene-propylene copolymer) heterophasic polymer, a (polypropylene-ethylene copolymer)-(ethylene-propylene copolymer) heterophasic polymer, and a (polypropylene)-(ethylene-propylene copolymer)-(ethylene-propylene-propylene copolymer) heterophasic polymer.

The content of the propylene copolymer component (II) in the heterophasic propylene polymer of the present embodiment is preferably 32 wt % or more, more preferably 35 wt % or more, furthermore preferably 40 wt % or more, based on a total weight of the heterophasic propylene polymer of 100 wt %.

In the present embodiment, examples of the α-olefin having 4 or more and 12 or less carbon atoms for use in the propylene copolymer component (I-2) or the propylene copolymer component (II) include 1-butene, 1-pentene, 1-hexene, 1-heptene, 1-octene, 1-nonene, 1-decene, 3-methyl-1-butene, 3-methyl-1-pentene, 4-methyl-1-pentene, 2-ethyl-1-hexene, and 2,2,4-trimethyl-1-pentene, preferably 1-butene, 1-hexene, and 1-octene, and more preferably 1-butene.

Second Embodiment

Figure 2:
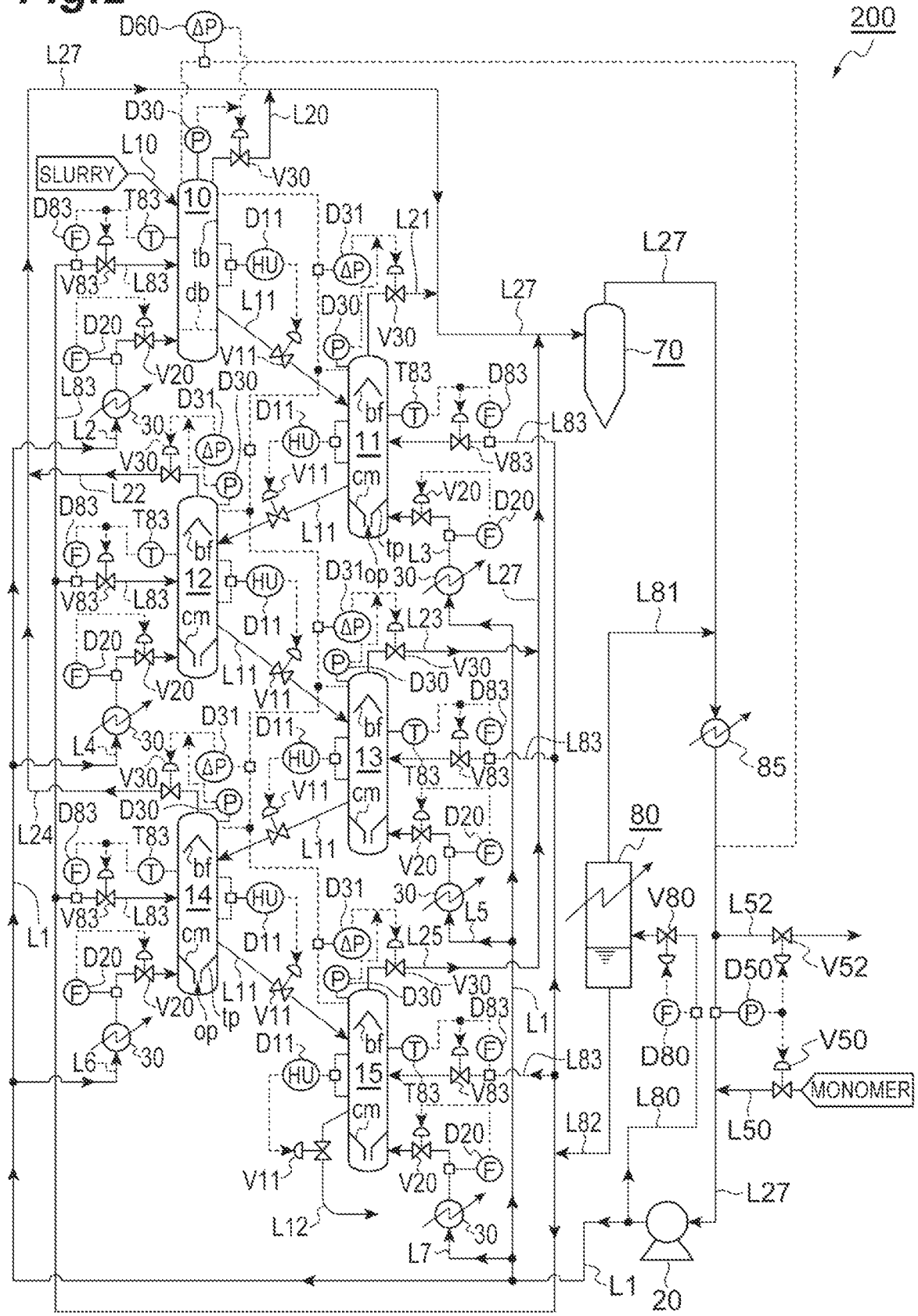
FIG. 2 is a flow chart illustrating polyolefin production system for use in the production method of polyolefins in a second embodiment of the present invention.

Subsequently, with reference to FIG. 2, a method for producing polyolefin particles with use of a polyolefin production system 200 in a second embodiment of the present invention is described.

In the present embodiment, a spouted bed of polyolefin particles is formed in the gas-phase polymerization tanks 11 to 15, differently from the first embodiment in which a fluidized bed of polyolefin particles is formed.

Specifically, the gas-phase polymerization tanks 11 to 15 are provided with a cone member cm having a tapered slope tp with inner diameter thereof becoming smaller downward and an opening op for gas introduction at the bottom end of the tapered slope tp, and a baffle bf installed above the opening op for gas introduction, instead of a distributor db.

The gas fed from the individual gas feed lines L2 to L7 is fed under the cone member cm. Thereby, the gas blows out upward from the opening op for gas introduction, so that a spouted bed of polyolefin particles is formed on the cone member cm.

According to the present embodiment, the same effect can be achieved as in the first embodiment.

Third Embodiment

Figure 3:
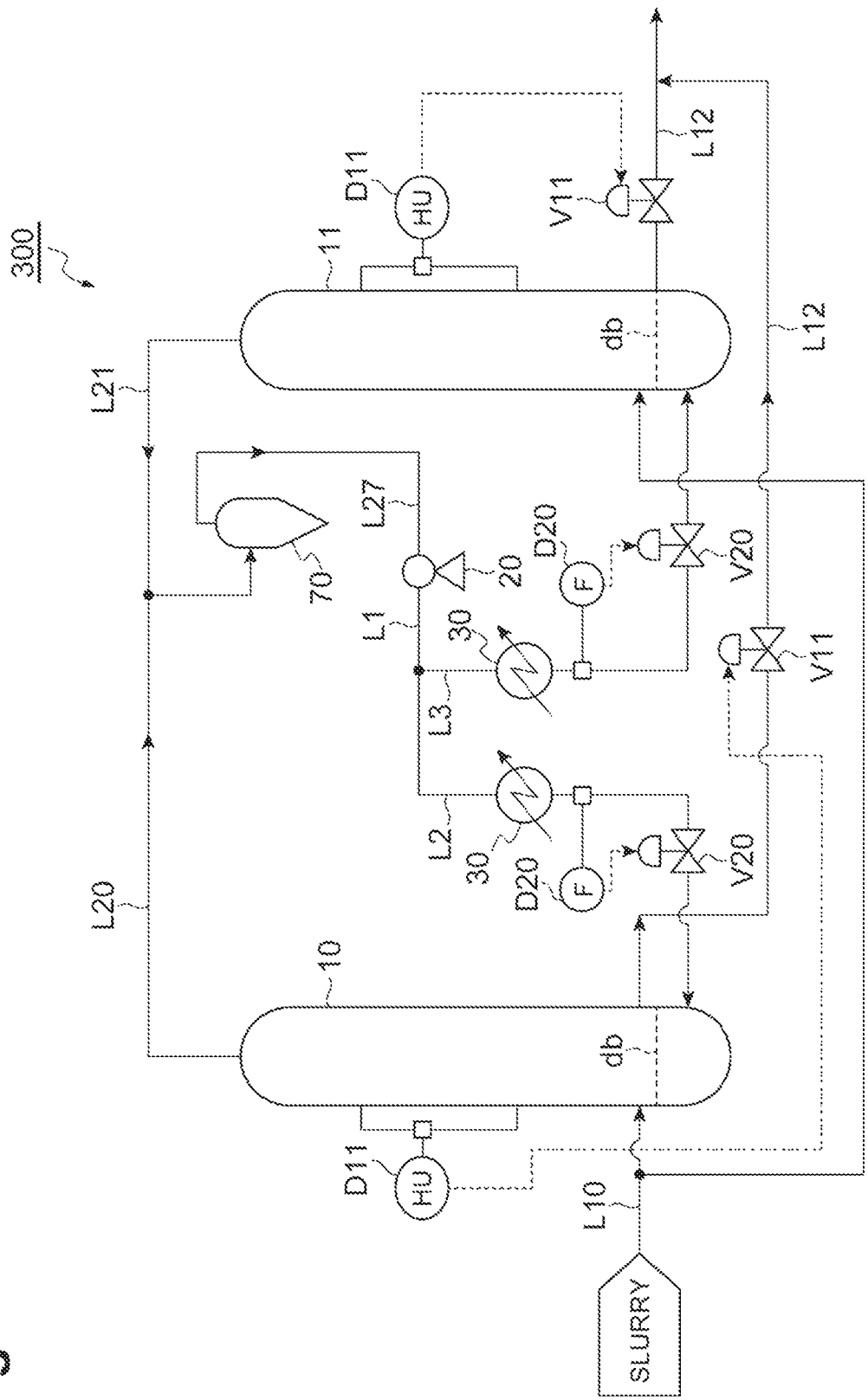
FIG. 3 is a flow chart illustrating a polyolefin production system for use in the production method of polyolefins in a third embodiment of the present invention.
Figure 4:
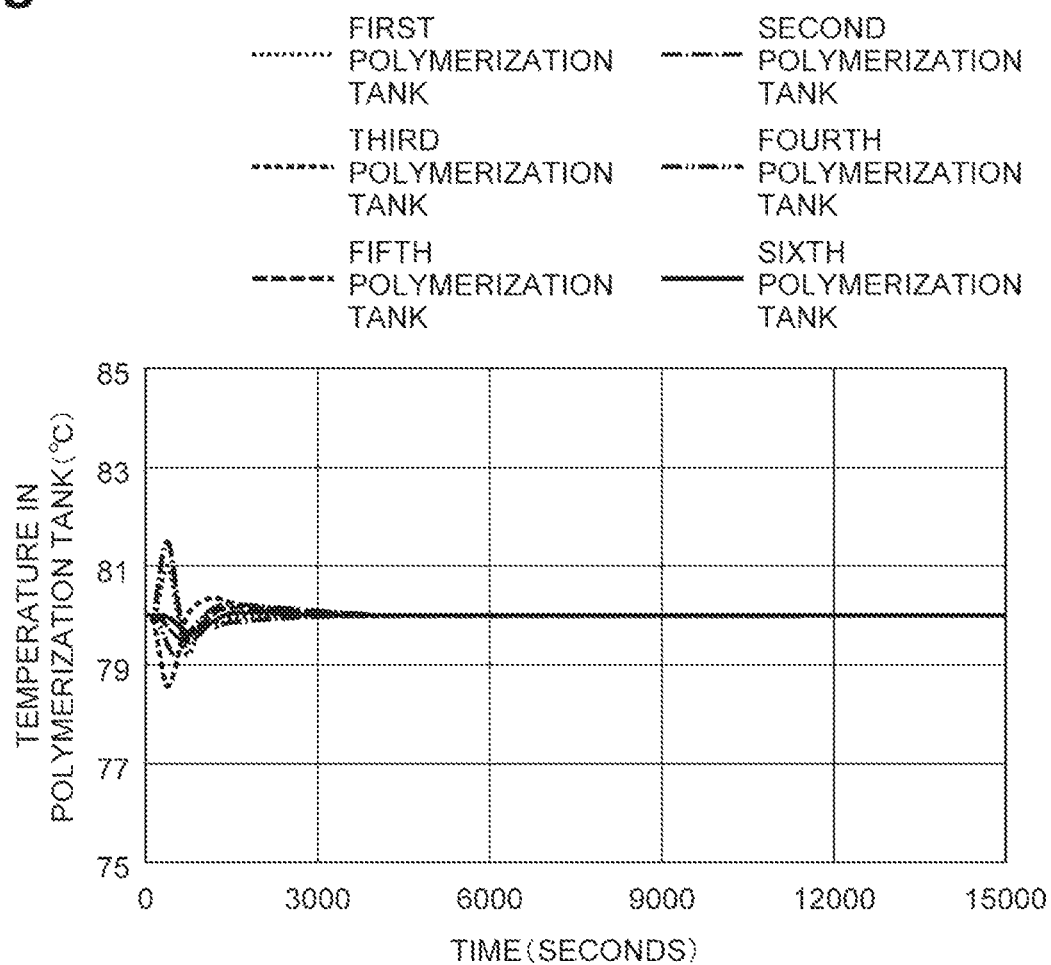
FIG. 4 is a graph illustrating a temporal change in temperature in each polymerization reaction tank when a disturbance 1 is added to the production method in a first embodiment.
Figure 5:
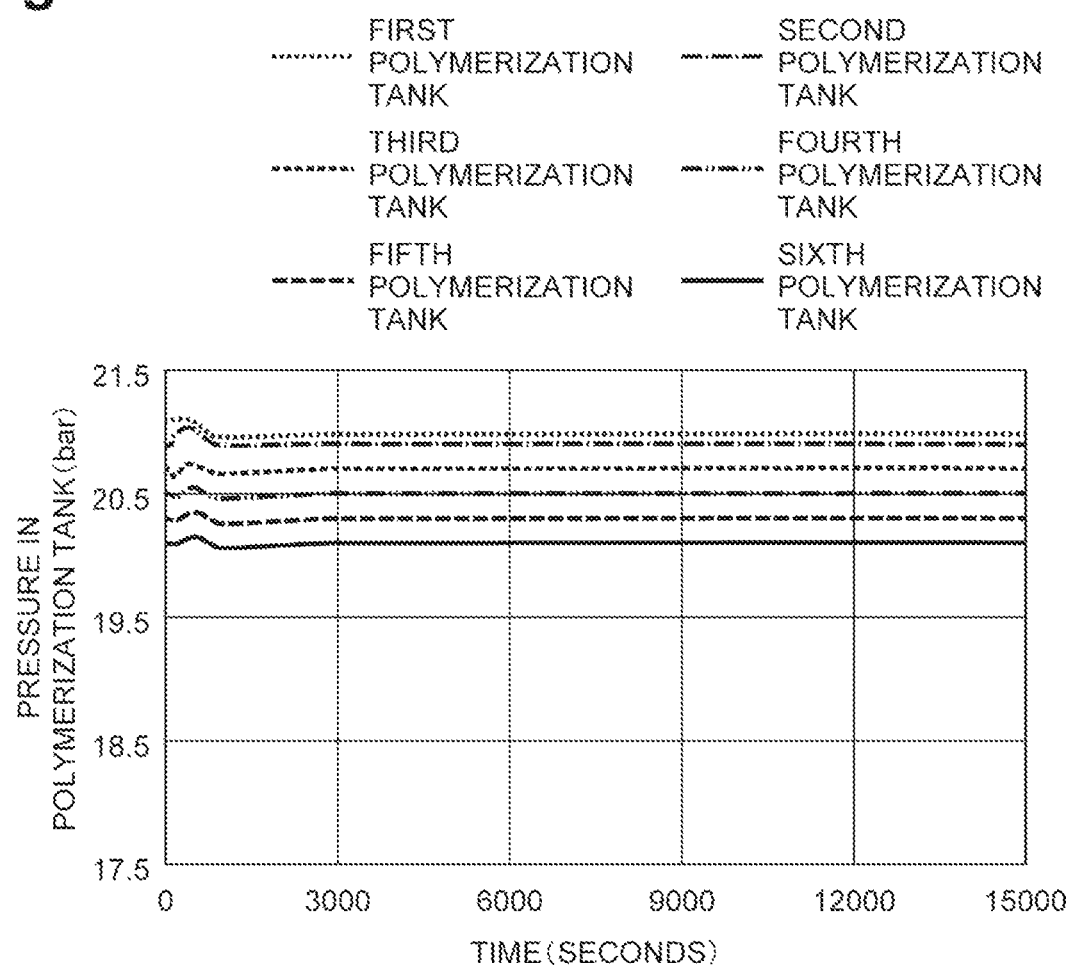
FIG. 5 is a graph illustrating a temporal change in pressure in each polymerization reaction tank when a disturbance 1 is added to the production method in a first embodiment.
Figure 6:
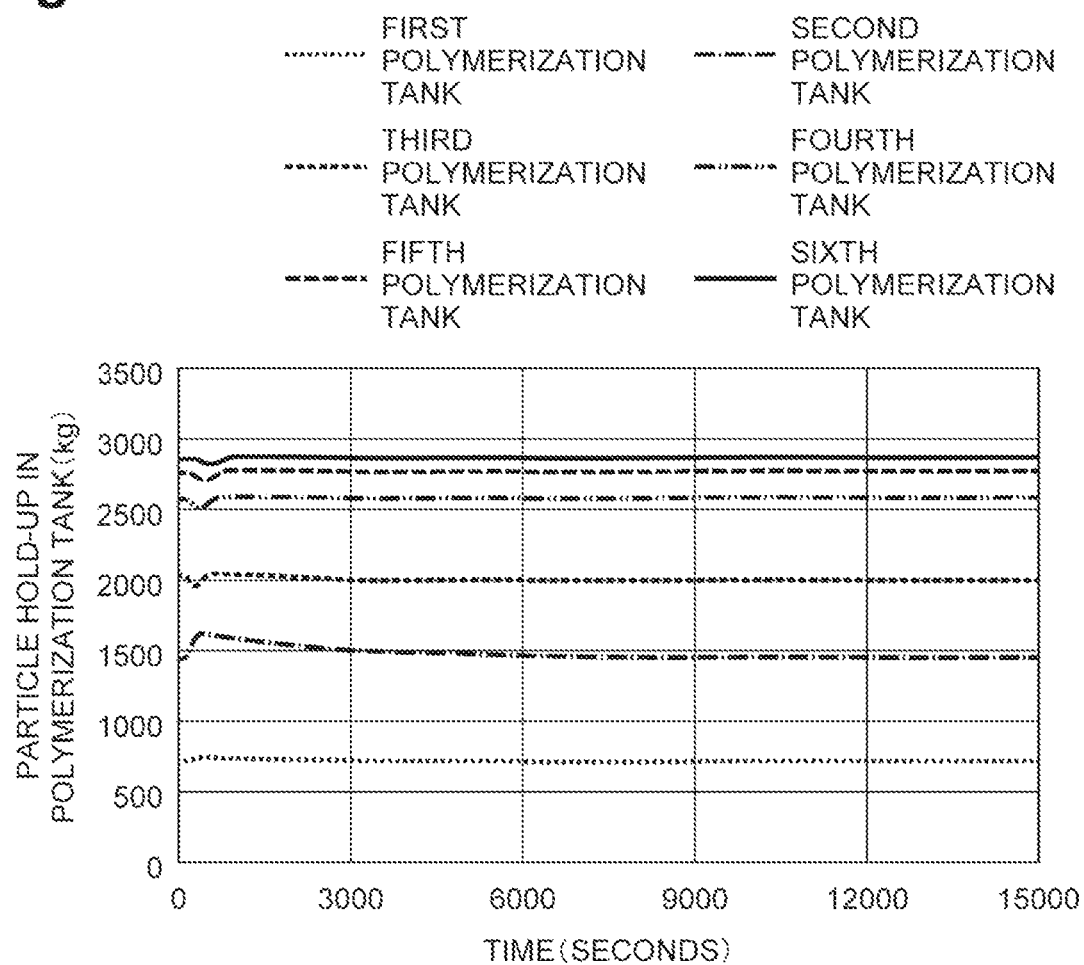
FIG. 6 is a graph illustrating a temporal change in particle hold-up in each polymerization reaction tank when a disturbance 1 is added to the production method in a first embodiment.
Figure 7:
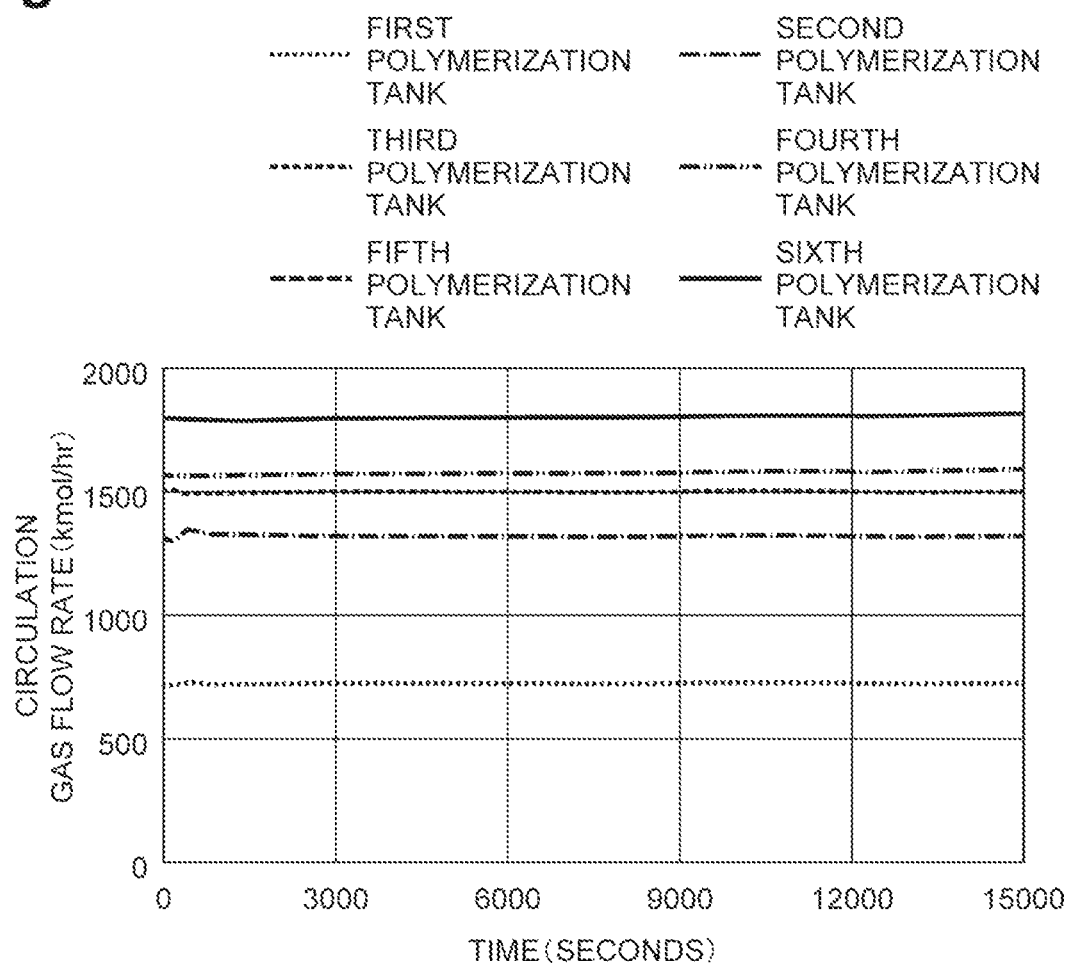
FIG. 7 is a graph illustrating a temporal change in feed rate of gas fed to each polymerization reaction tank when a disturbance 1 is added to the production method in a first embodiment.
Figure 8:
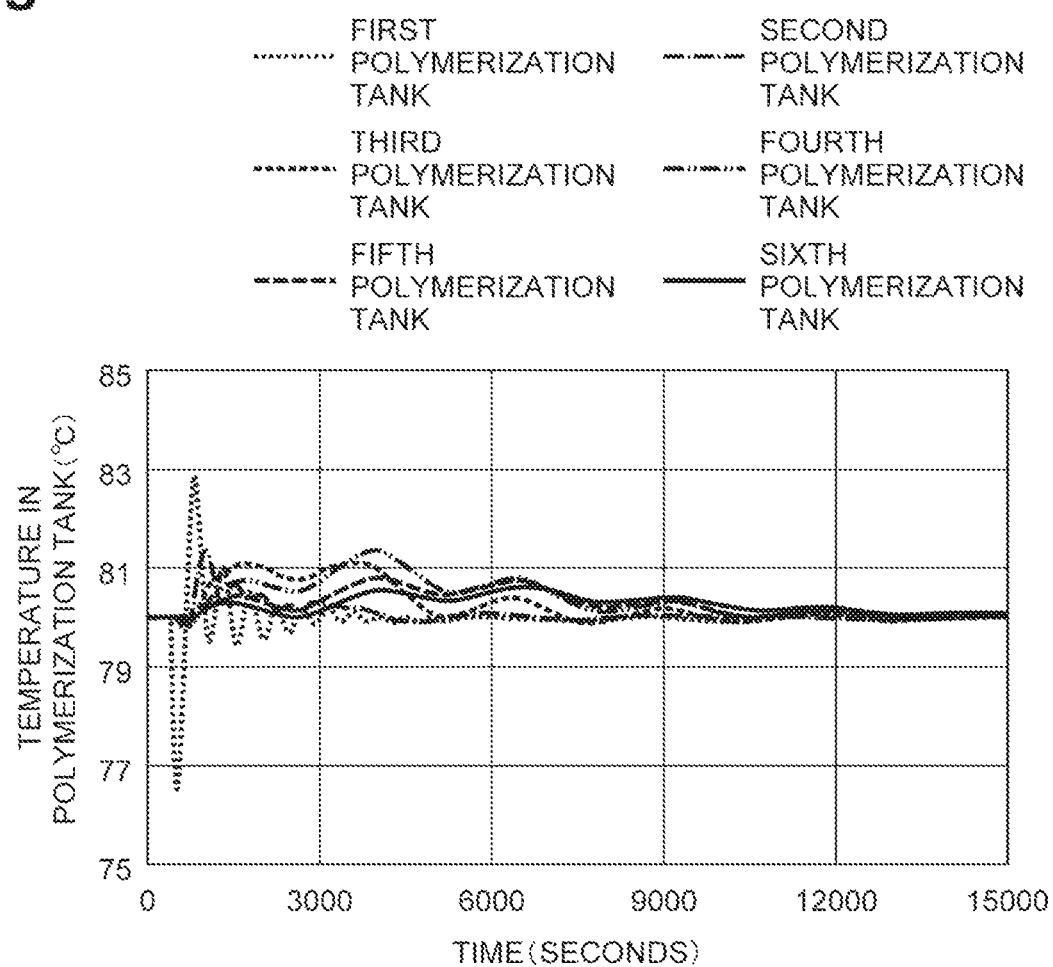
FIG. 8 is a graph illustrating a temporal change in temperature in each polymerization reaction tank when a disturbance 2 is added to the production method in a first embodiment.
Figure 9:
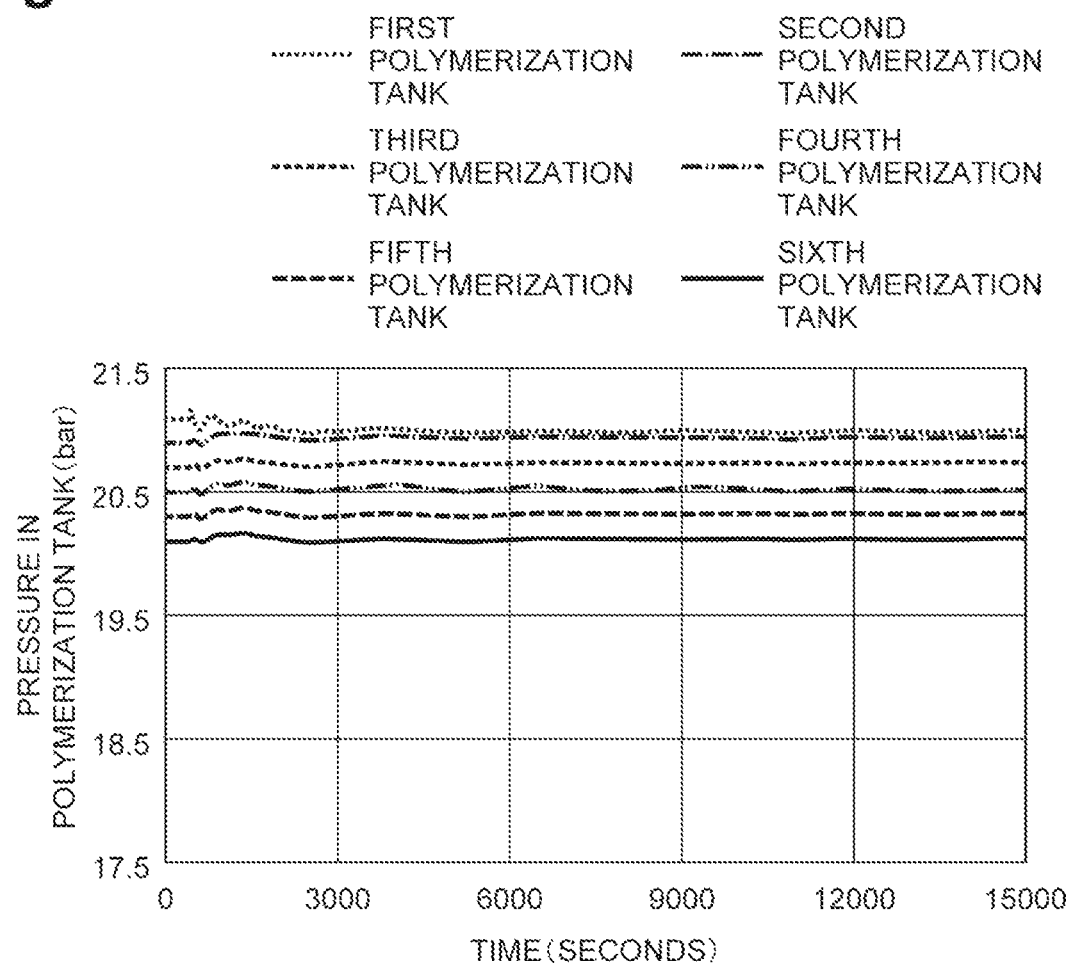
FIG. 9 is a graph illustrating a temporal change in pressure in each polymerization reaction tank when a disturbance 2 is added to the production method in a first embodiment.
Figure 10:
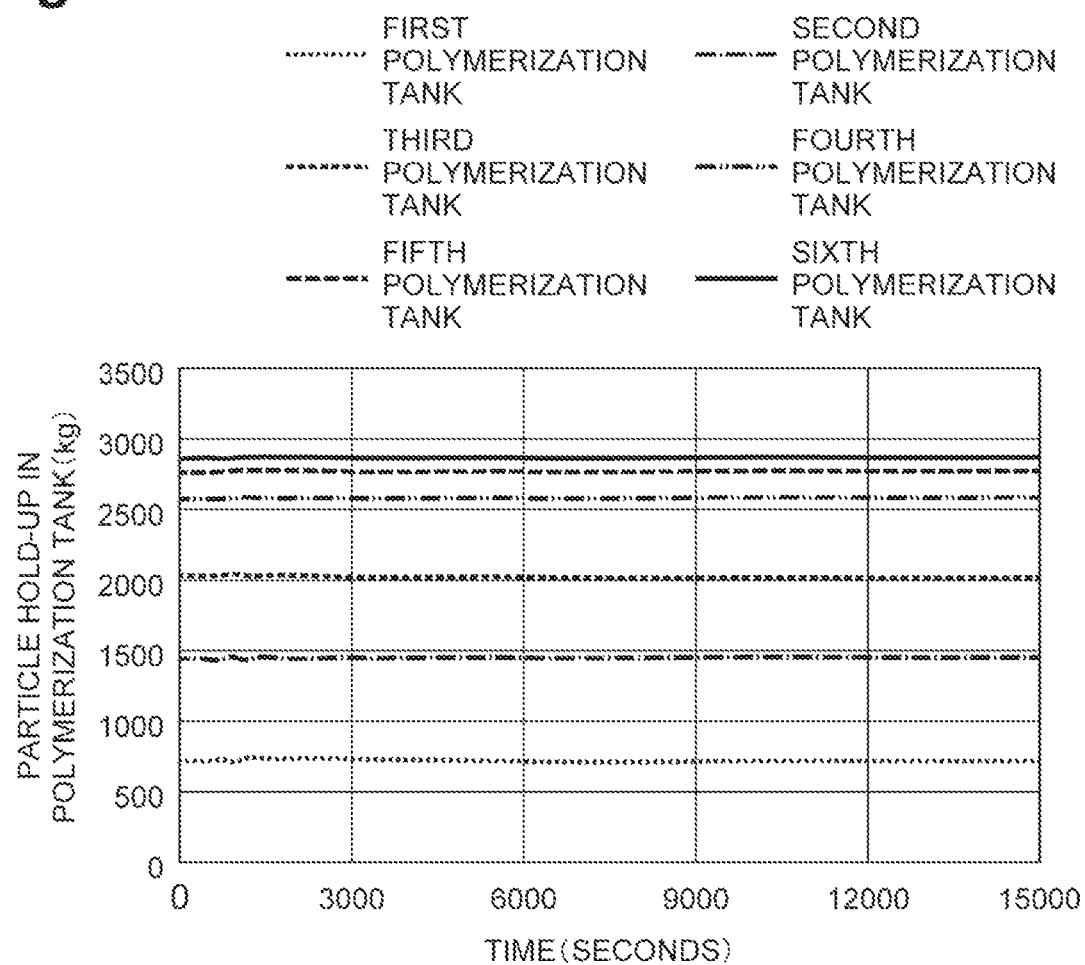
FIG. 10 is a graph illustrating a temporal change in particle hold-up in each polymerization reaction tank when a disturbance 2 is added to the production method in a first embodiment.
Figure 11:
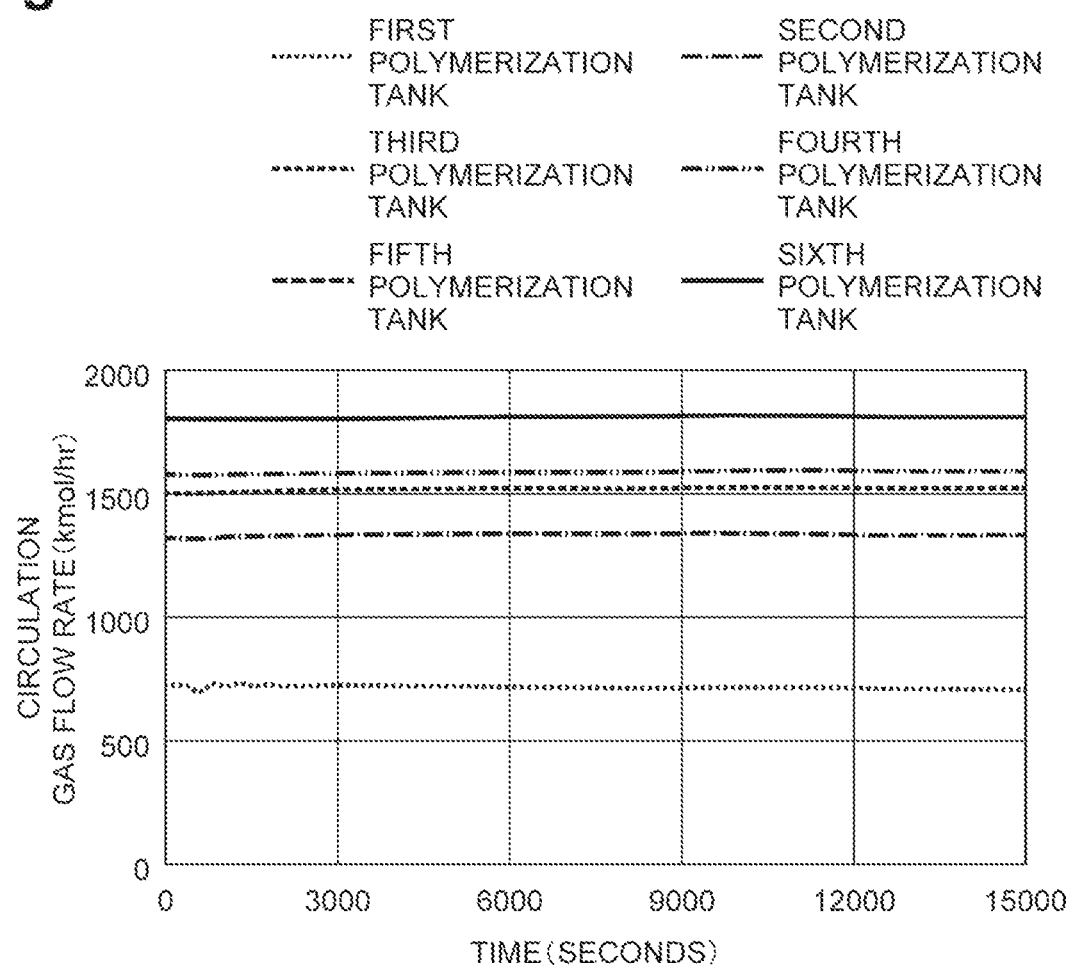
FIG. 11 is a graph illustrating a temporal change in feed rate of gas fed to each polymerization reaction tank when a disturbance 2 is added to the production method in a first embodiment.
Figure 12:
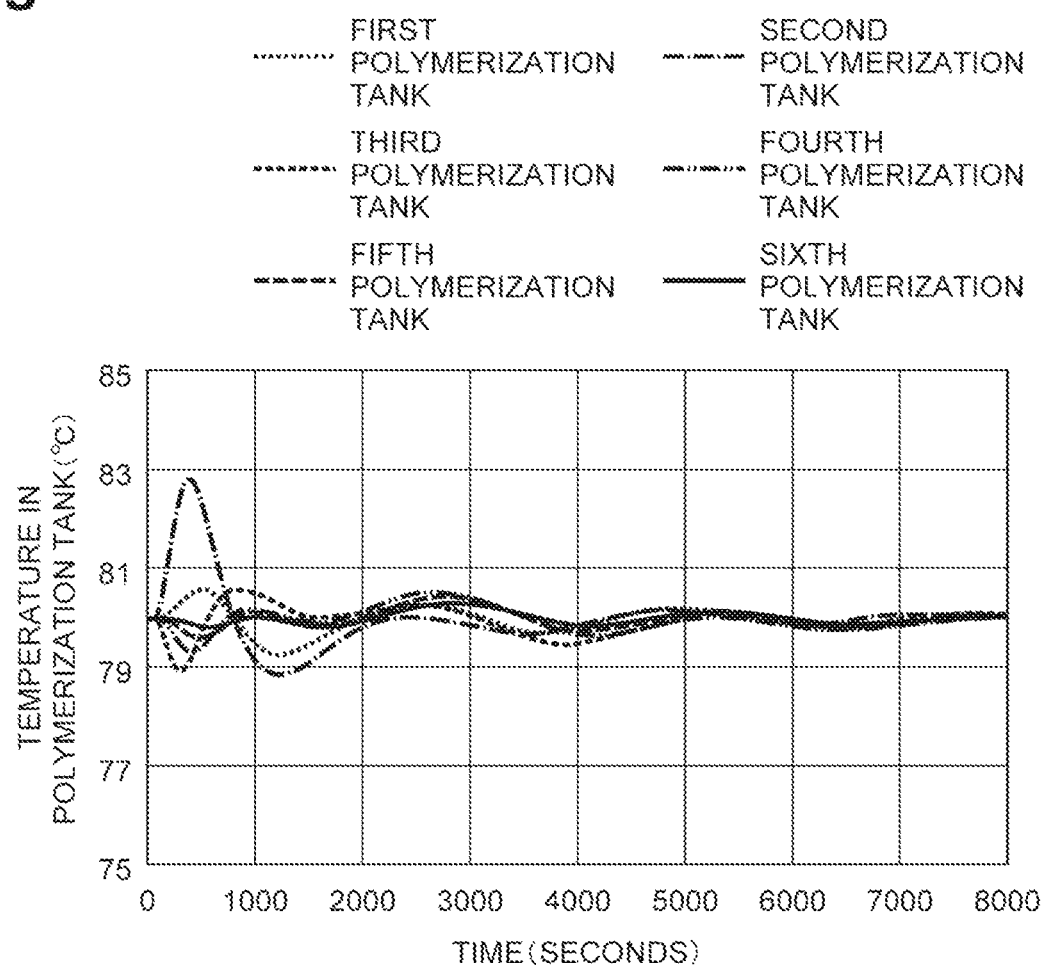
FIG. 12 is a graph illustrating a temporal change in temperature in each polymerization reaction tank when a disturbance 1 is added to the production method in a second embodiment.
Figure 13:
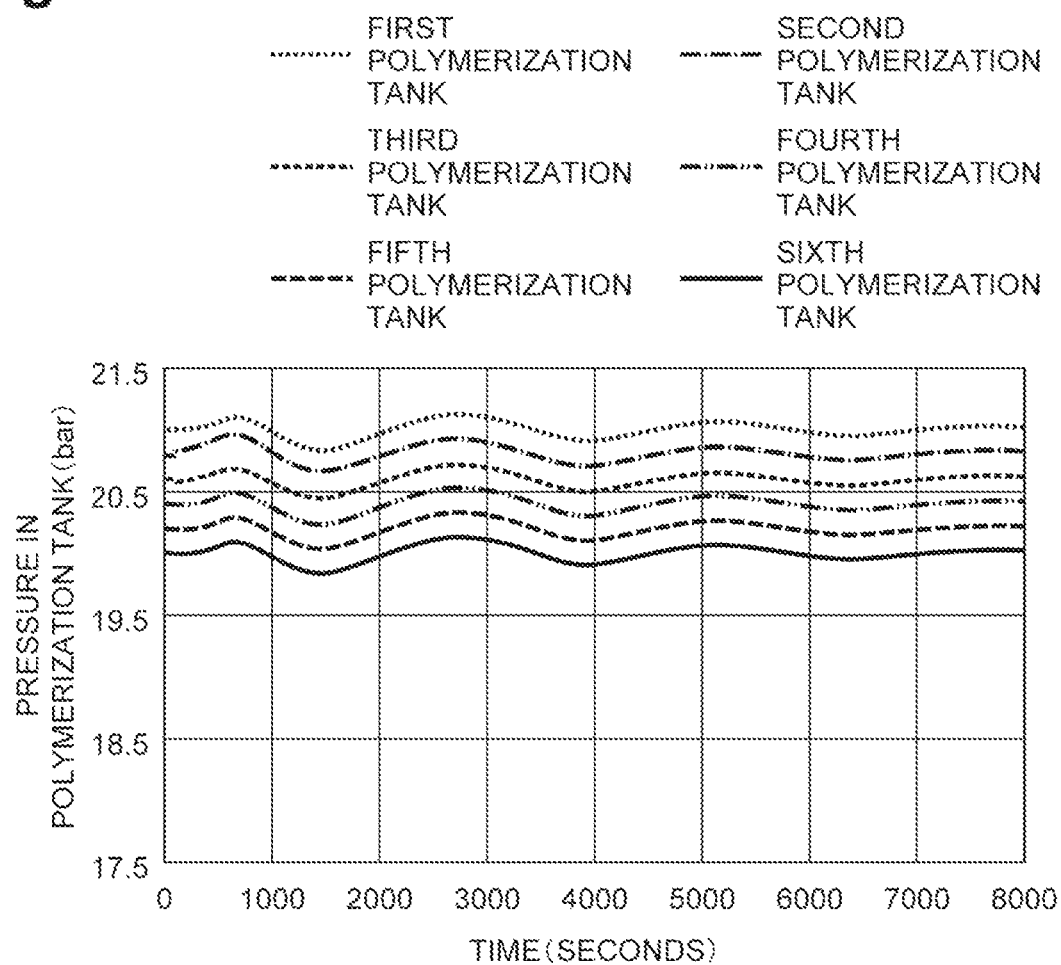
FIG. 13 is a graph illustrating a temporal change in pressure in each polymerization reaction tank when a disturbance 1 is added to the production method in a second embodiment.
Figure 14:
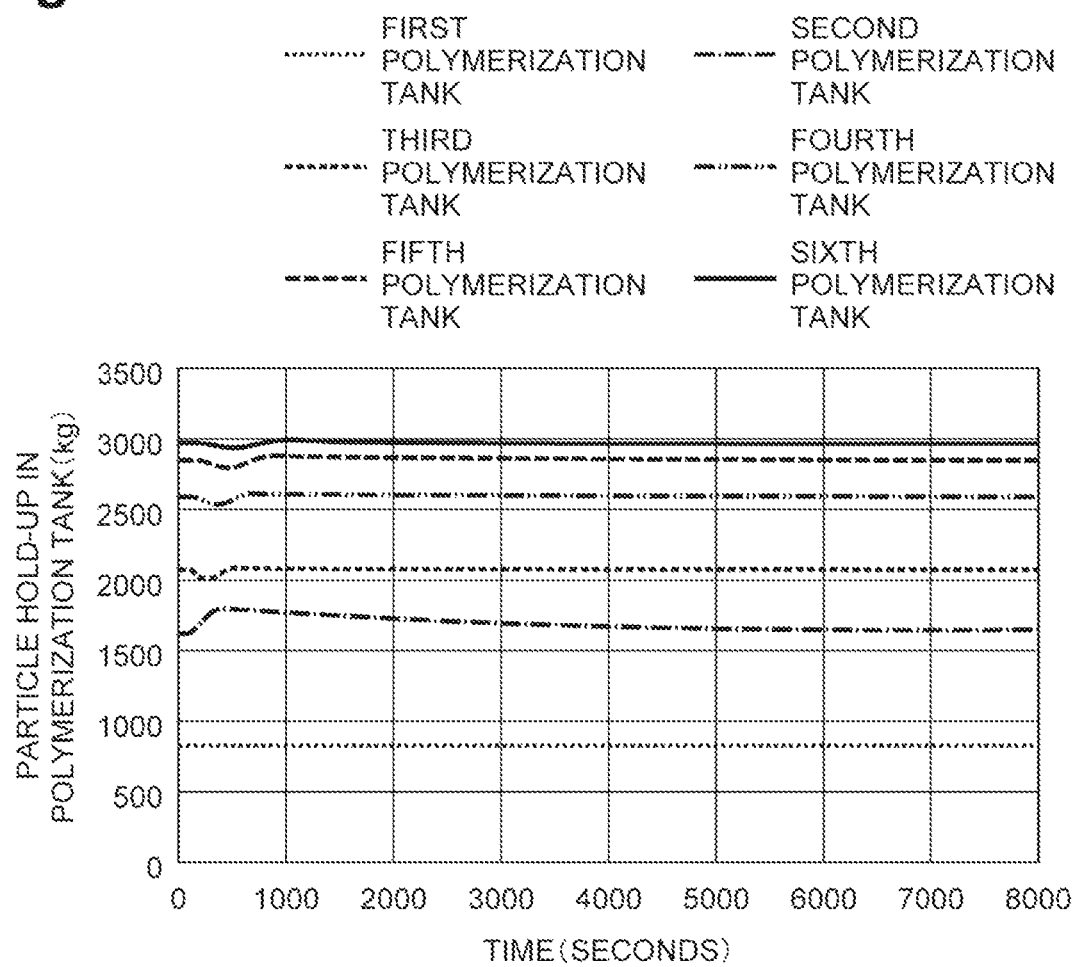
FIG. 14 is a graph illustrating a temporal change in particle hold-up in each polymerization reaction tank when a disturbance 1 is added to the production method in a second embodiment.
Figure 15:
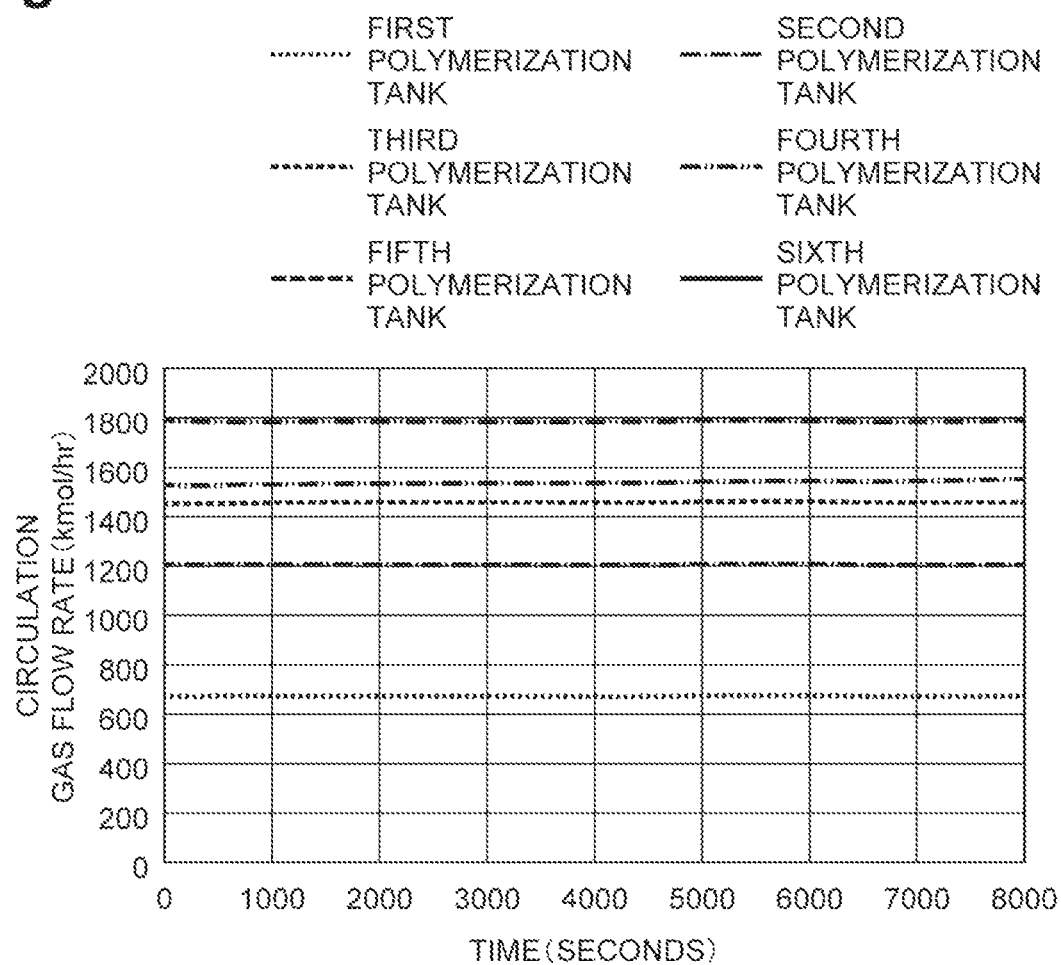
FIG. 15 is a graph illustrating a temporal change in feed rate of gas fed to each polymerization reaction tank when a disturbance 1 is added to the production method in a second embodiment.
Figure 16:
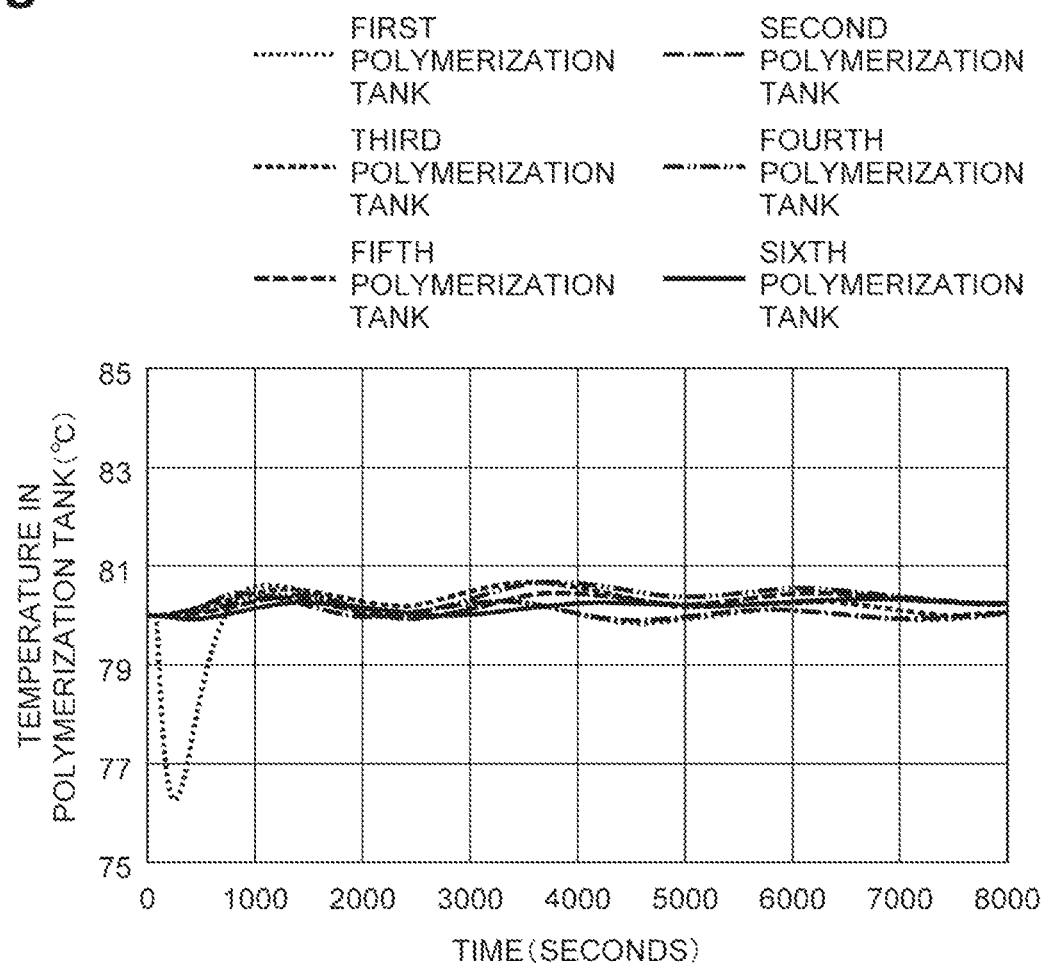
FIG. 16 is a graph illustrating a temporal change in temperature in each polymerization reaction tank when a disturbance 2 is added to the production method in a second embodiment.
Figure 17:
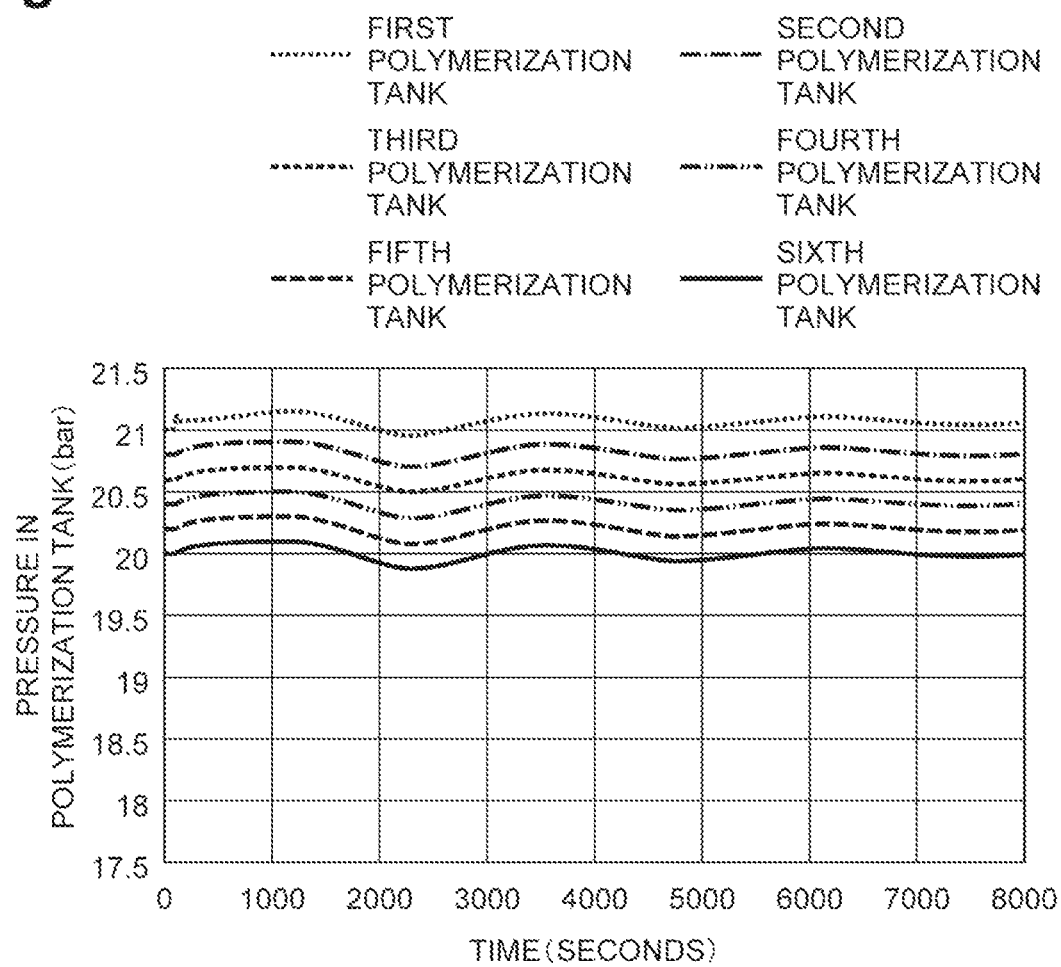
FIG. 17 is a graph illustrating a temporal change in pressure in each polymerization reaction tank when a disturbance 2 is added to the production method in a second embodiment.
Figure 18:
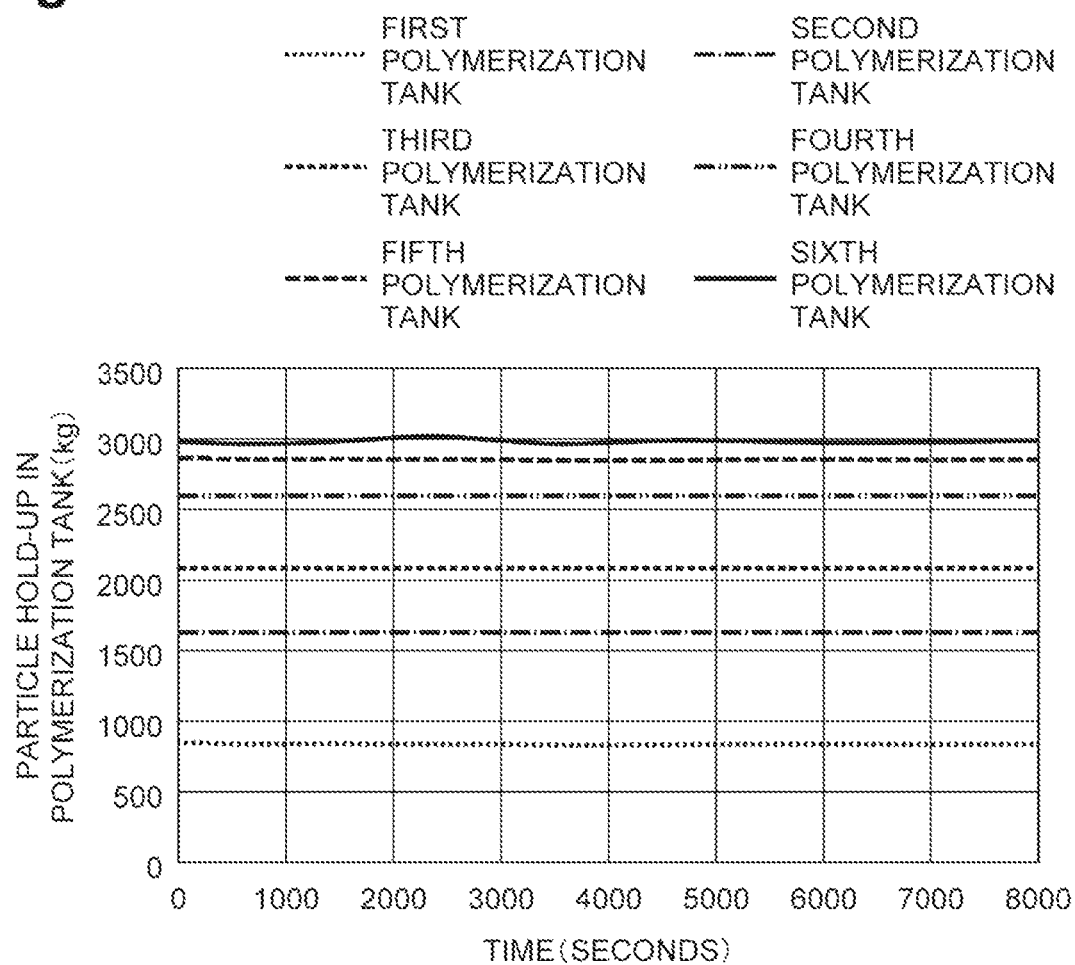
FIG. 18 is a graph illustrating a temporal change in particle hold-up in each polymerization reaction tank when a disturbance 2 is added to the production method in a second embodiment.
Figure 19:
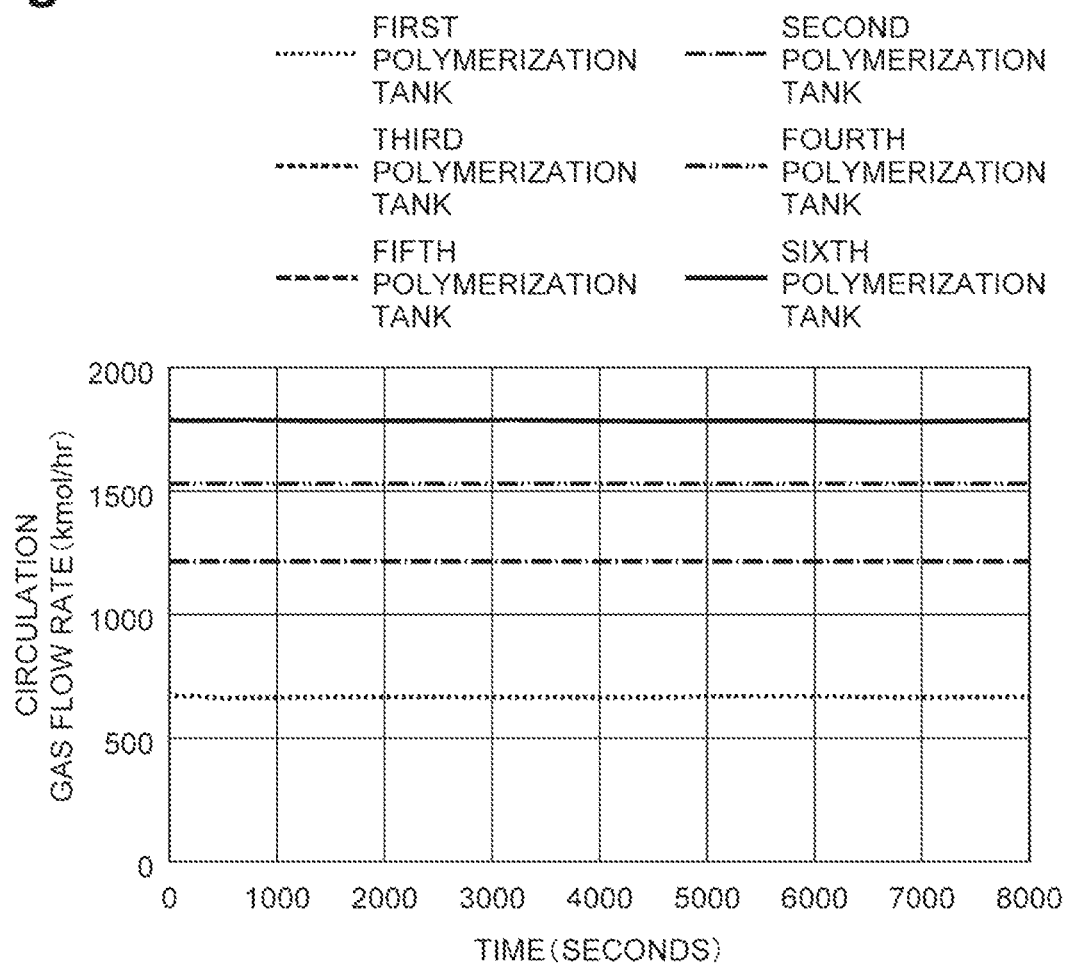
FIG. 19 is a graph illustrating a temporal change in feed rate of gas fed to each polymerization reaction tank when a disturbance 2 is added to the production method in a second embodiment.

Subsequently, with reference to FIG. 3, a method for producing polyolefin particles with use of a polyolefin production system 300 in a third embodiment of the present invention is described. Regarding the present embodiment, only the difference from the first embodiment is described. In FIG. 3, a line L50 for feeding monomers to a gas recovery line L27, a gas recovery line L52 for discharging the gas from the line L27, and the liquid monomer feed line having a condenser 80 and an individual liquefied olefin introduction line L83 are not shown in drawing.

The polyolefin production system 300 in the present embodiment has no particle transfer series line L11 and both of a catalyst component feed line L10 and a particle discharge line L12 are connected to each of gas-phase polymerization tanks 10 and 11, differently from the polyolefin production system 100 in the first embodiment. A polyolefin production system having two gas-phase polymerization tanks in total is disclosed as an example in FIG. 3.

According to the method in the present embodiment, a catalyst component is fed to each of the gas-phase polymerization tanks 10 and 11 through the line L10, and the polyolefin particles obtained by polymerization are discharged from each of the polymerization tanks 10 and 11 through the line L12 so as to be fed to a rear step.

In the present embodiment also, an olefin-containing gas compressed by one compressor 20 is fed to the gas-phase polymerization tanks 10 and 11 through the individual gas feed lines L2 and L3 respectively, and the gas discharged from the individual gas discharge lines L20 and L21 provided for the gas-phase polymerization tanks 10 and 11 can be returned to one compressor 20, so that the number of compressors can be reduced.

Also, the flow rate of the olefin containing gas to be fed to the gas-phase polymerization tanks 10 and 11 is controlled by a valve V20 installed in the individual gas feed lines L2 and L3 respectively. The flow rate of the gas fed to each of the gas-phase polymerization tanks 10 and 11 can be therefore easily controlled to be any constant value. The stable production of polyolefins can be thereby achieved.

Since particles are not transferred between the gas-phase polymerization tanks 10 and 11 in the present embodiment, it is not necessary to provide a difference in pressure between the gas-phase polymerization tanks 10 and 11. Although the necessity of installing a valve V30 for controlling pressure in the individual gas discharge lines L20 and L21 is therefore low, the pressure may be individually controlled by the installation.

Modified Aspect

The present invention is not limited to the embodiments described above, and various modified aspects can be employed.

For example, the number of the gas-phase polymerization tanks in each polyolefin production system is not particularly limited as long as the system has at least two gas-phase polymerization tanks.

Also, among a plurality of the gas-phase polymerization tanks, a fluidized bed may be formed in any of the gas-phase polymerization tanks, and a spouted bed may be formed in any of the gas-phase polymerization tanks. For example, a spouted bed may be formed in all the gas-phase polymerization tanks.

In order to stably form the fluidized bed, feeding an amount of gas to achieve the minimum fluidization velocity Umf or more described in Japanese Unexamined Patent Publication No. 2009-161735 is preferred.

In order to stably form the spouted bed, feeding an amount of gas to achieve the minimum superficial gas velocity Ums or more described in Japanese Unexamined Patent Publication No. 2009-161735 is preferred. The spouted bed height in a spouted bed can be the maximum spouted bed height LsMAX or less described in Japanese Unexamined Patent Publication No. 2009-161735.

In the present embodiment, it is preferable that the amount of gas in the fluidized bed is less than a fast fluidizing velocity Utr.

Also, although in the control of pressure in the gas-phase polymerization tanks 11 to 15, the aperture of the valve V30 is controlled based on the differential pressure between each of the gas-phase polymerization tanks 11 to 15 and the gas-phase polymerization. tank preceding the each of the gas-phase polymerization tanks, the aperture of the valve V30 may be controlled based on the pressure value in the gas-phase polymerization tank itself.

Also, although a slight difference in pressure is provided between the gas-phase polymerization tanks by the valve V30 to suitably transfer particles through the particle transfer series line L11 in the first and second embodiments, the difference in pressure between the gas-phase polymerization tanks may not be provided by the valve V30. For example, a mechanical method such as use of a screw feeder allows particles to be transferred without difference in pressure. In that case, it is not necessary to provide a valve V30 for pressure control in the individual gas discharge lines L20 to L25.

Also, the shape of the distributor db for use in forming a fluidized bed in the gas-phase polymerization tanks 10 to 15 is not particularly limited, and various types of gas distributors including a perforated plate, a mesh plate, and a perforated plate with a cap can be used.

Also, the shape of the cone member cm for use in forming a spouted bed in the gas-phase polymerization tanks 10 to 15 is not particularly limited as long as the cone member cm has a tapered slope tp with inner diameter thereof becoming smaller downward and an opening op for gas introduction at the bottom end of the tapered slope tp, and the spouted bed can be formed without installation of a baffle bf. It is preferable that the angle made between the tapered slope tp of the cone member cm and a horizontal plane is 20 to 80°.

Although the cone member cm is present independently from the bottom member to constitute a cylindrical container tb in the embodiment described above, the cone member cm may, of course, constitute the bottom of the cylindrical container tb, allowing the gas to be fed directly into the tank through the opening op.

Simulation Example

The stability of the method for producing a polyolefin in the first embodiment and the second embodiment was evaluated by a dynamic simulation. As a process simulator, Aspen Custom Modeler (available from AspenTech Japan Co., Ltd.) was used.

Under the following conditions, the production method in the first embodiment and the second embodiment was simulated.

A slurry of catalyst-containing polypropylene particles was continuously fed to a first gas-phase polymerization tank 10, and the particles in each of gas-phase polymerization tanks 10 to 15 were transferred to the rear gas-phase polymerization tanks through particle transfer series lines L11. The pressure in the front gas-phase polymerization tank was maintained higher than the pressure in the rear gas-phase polymerization tank, and the particle transfer series line L11 was inclined at an inclination angle θ of 60° as shown in FIG. 1. The amount of particles transferred was adjusted through the aperture of a valve V11 in the particle transfer series line L11, such that each particle hold-up of the fluidized bed in the gas-phase polymerization tank on the front tank was made constant.

The flow rate of the gas fed to the gas-phase polymerization tanks 10 to 15 was adjusted to be constant through a valve V20 in individual gas feed lines L2 to L7 respectively, and the pressure in the gas-phase polymerization tanks was adjusted to be constant through a valve V30 in individual gas discharge lines L20 to L25 respectively.

Removing of the polymerization heat in a fluidized bed in the gas-phase polymerization tanks 10 to 15 is performed by cooling the gas with a heat exchanger 30 installed in the individual gas feed lines L2 to L7 respectively. Also, a part of the gas discharged from a compressor was liquefied with a condenser 80, and the condensed liquid was individually fed to each of the gas-phase polymerization tanks 10 to 15 so as to remove the polymerization heat through the latent heat of the condensed liquid.

To a steady operation state constructed under the polymerization conditions shown in Table 1 (corresponding to the first embodiment) or Table 2 (corresponding to the second embodiment), the following disturbance 1 or 2 was added to confirm the temporal changes in the temperature, the pressure, the circulation gas flow rate, and the particle hold-up in each of the gas-phase polymerization tanks.

Disturbance 1: The transfer of propylene particles from the second gas-phase polymerization tank 11 to the third gas-phase polymerization tank 12 was suspended for 60 seconds.

Disturbance 2: The amount of slurry fed to the first gas-phase polymerization tank 10 was increased 1.2 times.

[Method for Evaluating Results of Simulation]

The case where the fluctuations of the temperature, pressure, circulation gas flow rate, and particle hold-up in each of the gas-phase polymerization tanks caused by a disturbance were in proportions of up to less than 10% relative to values in a steady state, and the fluctuations converged with time, with the operation state in a steady state recovered, was evaluated as having resistance to disturbance.

[Simulation Results on Addition of Disturbance 1 (Temporal Suspension of Polypropylene Particle Transport Between Tanks) in the First Embodiment (6-Stage Fluidized Bed)]

As shown in FIGS. 4 to 7, although each of the values fluctuated temporally in each of the gas-phase polymerization reaction tanks, the fluctuations were in proportions of up to less than 10% relative to values in a steady state, and the fluctuations converged with time, with the operation state in a steady state recovered, so that the polymerization process was confirmed to have resistance to disturbance.

[Simulation Results on Application of Disturbance 2 (1.2 Times Increase in Slurry Feed Rate to First Gas-Phase Polymerization Tank) in the First Embodiment (6-Stage Fluidized Bed)]

As shown in FIGS. 8 to 11, although each of the values fluctuated temporally in each of the gas-phase polymerization tanks, the fluctuations were in proportions of up to less than 10% relative to values in a steady state, and the fluctuations converged with time, with the operation state in a steady state recovered, so that the polymerization process was confirmed to have resistance to disturbance.

[Simulation Results on Application of Disturbance 1 (Temporal Suspension of Polypropylene Particle Transport Between Tanks) in Second Embodiment (1-Stage Fluidized Bed and 5-Stage Spouted Bed)]

As shown in FIGS. 12 to 15, although each of the values fluctuated temporally in each of the reaction tanks, the fluctuations were in proportions of up to less than 10% relative to values in a steady state, and the fluctuations converged with time, with the operation state in a steady state recovered, so that the polymerization process was confirmed to have resistance to disturbance.

[Simulation Results on Application of Disturbance 2 (1.2 Times Increase in Slurry Feed Rate to First Gas-Phase Polymerization Tank) in the Second Embodiment (1-Stage Fluidized Bed and 5-Stage Spouted Bed)]

As shown in FIGS. 16 to 19, although each of the values fluctuated temporally in each of the reaction tanks, the fluctuations were in proportions of up to less than 10% relative to values in a steady state, and the fluctuations converged with time, with the operation state in a steady state recovered, so that the polymerization process was confirmed to have resistance to disturbance.

TABLE 1

| | | First gas-phase polymerization tank | Second gas-phase polymerization tank | Third gas-phase polymerization tank | Fourth gas-phase polymerization tank | Fifth gas-phase polymerization tank | Sixth gas-phase polymerization tank |
|---|---|---|---|---|---|---|---|
| Temperature | ° C. | 80 | 80 | 80 | 80 | 80 | 80 |
| Pressure | bar | 21.1 | 20.9 | 20.7 | 20.5 | 20.3 | 20.1 |
| Feed rate of gas | kmol/hr | 770 | 1249 | 1422 | 1487 | 1712 | 1732 |
| Type of gas | — | Propylene | Propylene | Propylene | Propylene | Propylene | Propylene |
| Particle hold-up | kg | 710 | 1434 | 2025 | 2572 | 2763 | 2852 |
| Amount polymerized | kg/h | 1468 | 1467 | 1303 | 1443 | 921 | 750 |

TABLE 2

| | | First gas-phase polymerization tank | Second gas-phase polymerization tank | Third gas-phase polymerization tank | Fourth gas-phase polymerization tank | Fifth gas-phase polymerization tank | Sixth gas-phase polymerization tank |
|---|---|---|---|---|---|---|---|
| Temperature | ° C. | 80 | 80 | 80 | 80 | 80 | 80 |
| Pressure | bar | 21.1 | 20.9 | 20.7 | 20.5 | 20.3 | 20.1 |
| Feed rate of gas | kmol/hr | 676 | 1215 | 1460 | 1530 | 1780 | 1780 |
| Type of gas | — | Propylene | Propylene | Propylene | Propylene | Propylene | Propylene |
| Particle hold-up | kg | 830 | 1621 | 2070 | 2589 | 2851 | 2968 |
| Amount polymerized | kg/h | 1304 | 1331 | 1137 | 1038 | 893 | 761 |

What is claimed is:

1. A polyolefin production system comprising:
a plurality of gas-phase polymerization tanks configured to polymerize an olefin gas to form a polyolefin;
a compressor comprising an inlet and an outlet and being configured to compress an olefin-containing gas;
an individual gas feed line disposed at each of the gas-phase polymerization tanks, configured to guide the gas fed from the outlet of the compressor to each of the gas-phase polymerization tanks;
an individual gas discharge line disposed at each of the gas-phase polymerization tanks, configured to discharge the gas from each of the gas-phase polymerization tanks; and
a first valve installed in each of the individual gas feed lines.

2. The polyolefin production system according to claim 1, further comprising a particle transfer series line connecting the plurality of the gas-phase polymerization tanks in series.

3. The polyolefin production system according to claim 1, wherein the first valve is a butterfly valve or an eccentric rotary plug valve.

4. The polyolefin production system according to claim 1, further comprising a second valve installed in each of the individual gas discharge lines.

5. The polyolefin production system according to claim 4, wherein the second valve is a butterfly valve or an eccentric rotary plug valve.

6. The polyolefin production system according to claim 4, further comprising a gas recovery line connecting the plurality of the individual gas discharge lines and the inlet of the compressor to each other.

7. The polyolefin production system according to claim 1, comprising in each of the gas-phase polymerization tanks a cone member having a tapered slope with inner diameter thereof becoming smaller downward and an opening at the bottom end of the tapered slope, or a distributor.

8. A method for producing a polyolefin with use of the polyolefin production system according to claim 1, comprising:
a step of feeding an olefin-containing gas compressed by the compressor to the gas-phase polymerization tanks through the individual gas feed lines;
a step of returning the gas discharged from each of the gas-phase polymerization tanks to the compressor through each of the individual gas discharge lines; and
a step of controlling flow rates of the olefin-containing gas to be fed to the gas-phase polymerization tanks through the first valves installed in the individual gas feed lines.

9. The method according to claim 8, further comprising a step of forming in each of the gas-phase polymerization tanks a fluidized bed of polyolefin particles or a spouted bed of polyolefin particles.

10. A method for producing a polyolefin with use of the polyolefin production system according to claim 2, comprising:
a step of feeding an olefin-containing gas compressed by the compressor to the gas-phase polymerization tanks through the individual gas feed lines;
a step of returning the gas discharged from the gas-phase polymerization tanks to the compressor through the individual gas discharge lines;
a step of controlling flow rates of the olefin-containing gas to be fed to the gas-phase polymerization tanks through the first valves installed in the individual gas feed lines; and
a step of transferring polyolefin particles sequentially from the frontmost gas-phase polymerization tank to the rearmost gas-phase polymerization tank through the particle transfer series line.

11. The polyolefin production system according to claim 6, further comprising a first gas pressure gauge measuring a pressure difference between the pressure in the gas-phase polymerization tank and the pressure in the gas recovery line or between the pressure in the gas-phase polymerization tank and the pressure in a part downstream than the second valve in the individual gas discharge line,
a second pressure gauge measuring a pressure in the gas-phase polymerization tank, and
a third pressure gauge measuring a pressure difference between each of the gas-phase polymerization tanks and the gas-phase polymerization tank in a preceding or downstream position of each of the gas-phase polymerization tanks.

12. A method for producing a polyolefin with use of the polyolefin production system according to claim 11, comprising:
a step of feeding an olefin-containing gas compressed by the compressor to the gas-phase polymerization tanks through the individual gas feed lines;
a step of returning the gas discharged from the gas-phase polymerization tanks to the compressor through the individual gas discharge lines;
a step of controlling flow rates of the olefin-containing gas to be fed to the gas-phase polymerization tanks through the first valves installed in the individual gas feed lines; and
a step of controlling aperture of at least one of the second valves to control the gas discharge flow rate from the gas-phase polymerization tank in such a manner that the difference between the pressure in the gas-phase polymerization tank and the pressure in the gas recovery line, the difference between the pressure in the gas-phase polymerization tank and the pressure in the part downstream than the second valve in the individual gas discharge line connected to the gas-phase polymerization tank, the pressure in the gas-phase polymerization tank, or the difference between the pressure in the gas-phase polymerization tank and the pressure in the gas-phase polymerization tank in the upstream or downstream position than the gas-phase polymerization tank is in a desired range.

* * * * *